US009018293B2

(12) United States Patent
Callander et al.

(10) Patent No.: US 9,018,293 B2
(45) Date of Patent: *Apr. 28, 2015

(54) DISPERSIONS OF HIGH CARBOXYL POLYAMIDES INTO POLYESTERS

(71) Applicant: M&G USA Corporation, Apple Grove, WV (US)

(72) Inventors: Douglas David Callander, Bath, OH (US); Gianluca Ferrari, Portogruaro Venezia (IT); Arianna Giovannini, Tortona (IT); Maria Teresa Scrivani, Alessandria (IT); Simone Ferrero, Tortona (IT)

(73) Assignee: M&G USA Corporation, Apple Grove, WV (US)

( * ) Notice: Subject to any disclaimer, the term of this patent is extended or adjusted under 35 U.S.C. 154(b) by 95 days.

This patent is subject to a terminal disclaimer.

(21) Appl. No.: 13/652,533

(22) Filed: Oct. 16, 2012

(65) Prior Publication Data

US 2014/0107300 A1 Apr. 17, 2014

Related U.S. Application Data

(63) Continuation of application No. 11/552,591, filed on Oct. 25, 2006, now Pat. No. 8,314,174.

(60) Provisional application No. 60/730,197, filed on Oct. 25, 2005, provisional application No. 60/730,198, filed on Oct. 25, 2005.

(51) Int. Cl.
*C08G 69/48* (2006.01)
*C08L 67/02* (2006.01)

(52) U.S. Cl.
CPC ...................................... *C08L 67/02* (2013.01)

(58) Field of Classification Search
CPC ........................................................ C08G 69/48
USPC ......................................................... 524/394
See application file for complete search history.

(56) References Cited

U.S. PATENT DOCUMENTS 5,300,572 A 4/1994 Tajima et al.
5,747,548 A 5/1998 Bradt et al.
5,985,389 A 11/1999 Dalton et al.
6,239,233 B1 5/2001 Bell et al.
6,444,283 B1 9/2002 Turner et al.
6,500,895 B1 12/2002 Bastiaens et al.
6,689,437 B1 2/2004 Ubara et al.
2004/0013833 A1 1/2004 Lee et al.
2006/0122306 A1 6/2006 Stafford et al.
2007/0093615 A1* 4/2007 Callander et al. ............. 525/425

FOREIGN PATENT DOCUMENTS

| EP | 0964031 B1 | 12/1999 |
| EP | 1063070 A2 | 12/2000 |
| GB | 1218691 | 1/1971 |
| IN | 172789 | 11/1993 |
| JP | 63-213529 A1 | 9/1988 |
| JP | 3-193325 A | 8/1991 |
| JP | 3281246 A | 12/1991 |
| JP | 08-208950 A | 8/1996 |
| JP | 2663578 B2 | 6/1997 |
| JP | 10-7893 A | 1/1998 |
| WO | 9323474 A1 | 11/1993 |
| WO | 0109245 A1 | 2/2001 |
| WO | 2005/023530 A1 | 3/2005 |
| WO | 2005110694 A2 | 11/2005 |
| WO | 2006-079044 A2 | 7/2006 |

OTHER PUBLICATIONS

Sisson, Edwin, Appellants' Brief in the Prosecution of U.S. Appl. No. 11/552,591, Nov. 24, 2010.
Lee, Doris L., Examiner's Answer in the Prosecution of U.S. Appl. No. 11/552,591, Feb. 16, 2011.
Sisson, Edwin, Reply Brief in the Prosecution of U.S. Appl. No. 11/552,591, Apr. 9, 2011.
Record of Oral Hearing in Appeal No. 2011-007904, Apr. 11, 2012.
Decision on Appeal in Appeal No. 2011-007904, Apr. 30, 2012.

* cited by examiner

*Primary Examiner* — Doris Lee
(74) *Attorney, Agent, or Firm* — Edwin A. Sisson, Attorney at Law, LLC

(57) ABSTRACT

A polymer composition, stretched and unstretched articles and processes to make stretched and unstretched articles from that composition are set forth wherein the composition comprises a blend of a polyamide wherein the amino to carboxyl end group ratio of the polyamide polymer is less than 1.0 when the relative viscosity of the polyamide polymer is less than 2.0, and less than 0.30 when the relative viscosity is in the range of 2.0 to 2.3 and less than 0.20 when the relative viscosity is greater than 2.3, a crystallizable polyester and an interfacial tension reducing agent.

7 Claims, 6 Drawing Sheets

DISPERSIONS OF HIGH CARBOXYL POLYAMIDES INTO POLYESTERS

PRIORITY AND CROSS REFERENCES

This application is a continuation of, and claims the benefit of the priority of U.S. patent application Ser. No. 11/552,591 filed Oct. 25, 2006, U.S. Provisional Patent Application Ser. No. 60/730,197 filed Oct. 25, 2005, and U.S. Provisional Patent Application Ser. No. 60/730,198 filed Oct. 25, 2005. The teachings of these provisional patent applications all of which are incorporated in their entirety herein by reference.

FIELD OF INVENTION

This invention relates to a polymer composition useful for plastic packaging.

BACKGROUND OF THE INVENTION

Products sensitive to oxygen, particularly foods, beverages and medicines, deteriorate or spoil in the presence of oxygen. One approach to creating an oxygen free environment is to package such products in a container comprised of at least one layer of a so-called "passive" gas barrier film that is a physical barrier and reduces or eliminates the transmission of oxygen through the container wall but does not react with oxygen. For instance, layers of thermoplastic polyester (PET) are often supplemented with additional layers of packaging material to prevent oxygen permeation.

Adding a barrier layer of gas barrier film increases the overall passive-barrier of the package to other gases as well. Ethylvinyl alcohol (EVOH), polyvinylidene dichloride (PVDC), and polyamides like poly(m-xylylene adipamide) (MXD6), are examples of films commonly used for this purpose due to their excellent gas barrier properties. These materials are often used in beer packaging because the low permeation rate (high passive barrier) keeps the oxygen away from the product as well as keeping the carbon dioxide in the beverage. Distinct layers of differing materials are not preferred because the multilayer construction adds cost.

It is therefore preferable to blend all the components into a single layer, called a monolayer construction. The monolayer construction does not work for most compositions due to poor aesthetics. For example, a monolayer of poly(m-xylylene adipamide) (MXD6) blended into PET (polyethylene terephthalate or its crystallizable copolymers) has unacceptable haze at desirable barrier levels of the MXD6. This is particularly the case for the walls of stretch blow molded and reheat stretch blown containers or stretched film wraps. In the reheat stretch blown container, for example, the MXD6 is dispersed into the PET and the composition subsequently injection molded into an amorphous article called a preform. The preform is a container itself and is generally tube shaped with one closed end and optionally threads to receive the screw cap around the opening of the other end. In the case of the preform for a jar, the length of the tube is so small that the preform resembles a diaphragm or disk.

The preform can then be stretched, also known as orienting the material, into the shape of the container. Depending upon the process, the preform can be stretched after injection or extrusion molding but before it cools below the glass transition temperature or the major component (usually the polyester). Alternatively, the cold molded preform can be stretched after being reheated to above the glass transition or softening temperature of the composition making up the preform. The unstretched preform of MXD6 dispersed into PET is typically transparent with very little haze. However, upon stretching, or being pulled, pushed out or even squished, the subsequent thinned wall has a tremendous amount of haze. This haze is such that it renders an uncoloured monolayer bottle with stretched walls made from polyester-polyamide blends unmarketable.

According to U.S. Pat. No. 6,288,161, haze and colour are caused by a change in the refractive index of the materials when the polymers are oriented. Orientation enlarges the size of MXD6 domains so that the size of enough domains are greater than the minimum wavelength of visible light (approximately 400 nm) resulting in increased light scattering.

Table 1 of U.S. Pat. No. 6,288,161 shows a fourfold increase in haze when the article is oriented (stretched) to a 9 drawdown ratio. Tables 2 and 3 of U.S. Pat. No. 6,288,161 show even larger haze differences caused by the reheat stretch blow molding of the container wall.

U.S. Pat. No. 6,288,161 teaches overcoming the haze by using a low stretch process to limit the degree of orientation so that the MXD6 domains are less than the minimum wavelength of visible light. Low stretch is achieved through a process called extrusion blow molding. Low stretch extrusion blow molding is inferior to high stretch processes such as reheat blow and injection stretch blow mold because of the economics and the significantly greater barrier properties associated with the higher stretch ratios (drawdowns). There exists therefore a need for a low haze mono-layer high stretched wall comprised of a polyester and a polyamide, preferably MXD6.

U.S. Pat. No. 6,444,283 discloses that the haze of a film of polyester blended with a polyamide increases with increasing amounts of polyamide. U.S. Pat. No. 6,444,283 teaches that the reduction of the haze of a film comprising polyester blended with a polyamide can be reduced by using a polyamide with a number average molecular weight less than 15000 and an amino to carboxyl end group ratio greater than or equal to 1.0. At present, there is no commercial grade of MXD6, the preferred polyamide, available at the required molecular weight taught in U.S. Pat. No. 6,444,283.

Japanese Patent Application H10-7893 to Harada et al, teaches that good transparency of a polyester/mx polyamide blend can be obtained without a compatibilizer when the end groups satisfy the equations of $$50 < a-b < 300 \text{ and} \tag{1}$$

$$a+b < 300, \tag{2}$$

where a is the number of amino end groups in micro equivalents per gram and b is the number of carboxyl end groups in micro equivalents per gram. Harada et al teaches that if in formula 1) a−b is less than 50 a resin with a clearly improved transparency of the blended resin composition can not be obtained. For a−b to be greater than 50, the number of amino end groups must therefore exceed the number of carboxyl end groups. When the number of amino groups exceeds the number of carboxyl groups, the amino to carboxyl end group ratio is by definition greater than 1.0.

WO 2004/069909 teaches that the haze can be visually masked by adding a colorant to absorb the light at the wavelengths corresponding to the size of incompatible domains, such as polyamide, dispersed in the polyester. Because this technique requires a colorant its use is limited to coloured bottles.

There exists, therefore, a need for an uncoloured polyester-polyamide composition which does not produce an unacceptable visual haze when stretched.

United State Patent Application 2004/0013833 A1 discloses a compatibilized polymer blend comprising polyamide, PET or PET containing copolymer, and at least one compatibilizer. Preferred compatibilizers of United State Patent Application 2004/0013833 A1 include, but are not limited to, polyester ionomers, are the polycondensation reaction products of an aromatic dicarboxylic acid or its ester-forming derivative, a diol or its ester forming derivative, and an ester forming compound comprising an ionic sulfonate group disclosed in U.S. Pat. No. 6,500,895 B1.

Japanese Patent Application 0 3181246 A, is aimed at improving the impact resistance of multi-layer structures. The application discloses a composition of the sulfonated polyester and MXD6 and claims:

1) a multilayer structure consisting of at least two layers of a m-xylilenediamine group containing polyamide (A) layer and a thermoplastic polyester (B1) or polycarbonate (B2) layer, which contains, with respect to the total diol and/or the total dicarboxylic acid, 0.1-20 mol. % of a diol and/or dicarboxylic acid represented by the formula X—R
Where X is a diol or dicarboxylic acid, and R is —SO$_3$Y, —COOY, —OY, —PO(OY)$_2$, —PO$_3$Z,

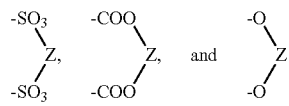

Where Y is a monovalent metal and Z is a bivalent metal.

The authors of Japanese Patent Application 0 3181246 state that the composition relates to multilayer structures, especially to co-injection stretched multilayer structures and compositions, with considerably improved impact-resistant delamination properties and that the divalent metals perform better than the monovalent metals.

U.S. Pat. No. 5,300,572 discloses a moldable polyester resin composition and molded articles there from include, based on the total weight of all resin compositions: A) between 2 to 98% by weight of a compatabilizing metal sulfonate group-containing aromatic polyester copolymer which is the polycondensation reaction product of (a) an aromatic dicarboxylic acid or its ester-forming derivative, (b) a diol compound or its ester-forming derivative, and (c) an ester-forming compound containing a metal sulfonate group; B) between 2 to 98% by weight of an additive resin which is one of (B-I) an olefin copolymer which is the copolymerization reaction product between an olefin with a least one of an a,b-unsaturated carboxylic acid or its derivative and a vinyl alcohol or its ester, (B-II) a polyamide resin; and optionally (C) between 0 to 96% by weight of a non-compatabilizing aromatic polyester resin, and again the bivalent metal is the preferred compatibilizer.

U.S. Pat. No. 5,300,572 discloses neither the role of the end groups nor the use of the modified polyester and polyamide composition in a stretched article such as the wall of a reheat stretch or even extrusion blow container.

There exists therefore a need for a polyester/polyamide composition that can create a low haze stretched wall monolayer container.

Japanese Patent Application JP 2663578-B2 to Kamatsu advocates the use of sodium isophthalate sulfonate copolymerized into the polyester to compatibilize polyester and polyamide blends. The examples provided in Japanese Patent Application JP 2663578-B2 are all based on sodium sulfoisophthalate and show only a reduction in haze and increased haze with increased amounts of MXD6.

PCT Application WO 2005/023530 claims the use of cobalt and zinc to reduce the increased color from blending a polyester, an ionic compatibilizer and partially aromatic polyamide. The application teaches that the divalent metal is more effective than monovalent metals and has examples showing that the domains of MXD6 dispersed into a copolymer with sodium isophthalic acid are approximately 200 nm.

The cobalt compounds useful in WO 2005/023530 include cobalt acetate, cobalt carbonate, cobalt chloride, cobalt hydroxide, cobalt naphthenate, cobalt oleate, cobalt linoleate, cobalt octoate, cobalt stearate, cobalt nitrate, cobalt phosphate, cobalt sulphate, cobalt (ethylene glycolate), and mixtures of two or more these, among others. As a transition metal catalyst for active oxygen scavenging, a salt of a long chain fatty acid is preferred, cobalt octoate or stearate being the most preferred. For colour control WO 2005/023539 prefers cobalt acetate. However, information in the market is that beer companies for example, do not desire cobalt in their packages for perceived marketing concerns.

None of the above mentioned prior art discloses a technique to achieve dispersed particles with average particle size less than 200 nm when stretched, a good colour composition which will not experience substantially increased haze with increasing amounts of dispersed material, or has an acceptable haze upon manufacturing and has good colour, particularly in the absence of cobalt.

SUMMARY OF INVENTION

Disclosed is a stretched wall of a container comprised of at least one stretched layer with said stretched layer comprising a polyamide polymer, a crystallizable polyester and an interfacial tension reducing agent, wherein the polyamide polymer comprises a reaction product selected from the group consisting of the reaction product of amino caproic acid with itself and the reaction product of A-D where A is a residue of a dicarboxylic acid comprising adipic acid, isophthalic acid, terephthalic acid, 1,4 cyclohexanedicarboxylic acid, or naphthalenedicarboxylic acid and where D is a residue of a diamine comprising m-xylylene diamine, p-xylylene diamine, hexamethylene diamine, ethylene diamine, or 1,4 cyclohexanedimethylamine, wherein the amino to carboxyl end group ratio of the polyamide polymer is less than 1.0 when the relative viscosity of the polyamide polymer is less than 2.0, and less than 0.30 when the relative viscosity is in the range of 2.0 to 2.3 and less than 0.20 when the relative viscosity is greater than 2.3, and at least 85% of the crystallizable polyester's acid units are derived from the group consisting of terephthalic acid, 2,6 naphthalene dicarboxylic acid, the dimethyl ester of terephthalic acid, or the dimethyl ester of 2,6 naphthalene dicarboxylic acid.

It is further disclosed that the polyamide polymer is preferably MXD6 or nylon 6, with the interfacial tension reducing agent comprises a metal sulfonate and/or lithium and that the amino to carboxyl end group ratio of the polyamide polymer be less than 0.20.

Also disclosed is a polymer composition comprising a polyamide polymer, a crystallizable polyester and an interfacial tension reducing agent, wherein the polyamide polymer comprises a reaction product selected from the group consisting of the reaction product of amino caproic acid with itself and the reaction product of A-D where A is a residue of a dicarboxylic acid comprising adipic acid, isophthalic acid, terephthalic acid, 1,4 cyclohexanedicarboxylic acid, or naphthalenedicarboxylic acid and where D is a residue of a diamine comprising m-xylylene diamine, p-xylylene diamine, hexamethylene diamine, ethylene diamine, or 1,4 cyclohexanedimethylamine, wherein the amino to carboxyl end group ratio of the polyamide polymer is less than 1.0 when the relative viscosity of the polyamide polymer is less than 2.0, and less than 0.30 when the relative viscosity is in the range of 2.0 to 2.3 and less than 0.20 when the relative viscosity is greater than 2.3, and at least 85% of the crystallizable polyester's acid units are derived from the group consisting of terephthalic acid, 2,6 naphthalene dicarboxylic acid, the dimethyl ester of terephthalic acid, and the dimethyl ester of 2,6 naphthalene dicarboxylic acid and, an interfacial tension reducing agent.

It is further disclosed that the polyamide polymer of the composition is preferably MXD6 or nylon 6, with the interfacial tension reducing agent comprises a metal sulfonate and/or lithium and that the amino to carboxyl end group ratio of the polyamide polymer be less than 0.20.

This invention further discloses a process for making a stretched wall of a container comprising the steps of A) selecting an article comprised of a polyamide polymer, a crystallizable polyester and an interfacial tension reducing agent, wherein the polyamide polymer comprises a reaction product selected from the group consisting of the reaction product of amino caproic acid with itself and the reaction product of A-D where A is a residue of a dicarboxylic acid comprising adipic acid, isophthalic acid, terephthalic acid, 1,4 cyclohexanedicarboxylic acid, or naphthalenedicarboxylic acid and where D is a residue of a diamine comprising m-xylylene diamine, p-xylylene diamine, hexamethylene diamine, ethylene diamine, or 1,4 cyclohexanedimethylamine, wherein the amino to carboxyl end group ratio of the polyamide polymer is less than 1.0 when the relative viscosity of the polyamide polymer is less than 2.0, and less than 0.30 when the relative viscosity is in the range of 2.0 to 2.3 and less than 0.20 when the relative viscosity is greater than 2.3, and wherein at least 85% of the crystallizable polyester's acid units are derived from the group consisting of terephthalic acid, 2,6 naphthalene dicarboxylic acid, the dimethyl ester of terephthalic acid, and the dimethyl ester of 2,6 naphthalene dicarboxylic acid, and wherein the polyamide is present from 1 to 15 parts per 100 parts polyamides plus crystallizable polyesters plus interfacial tension reducing agents in the composition; B) adjusting the temperature of the article so that the temperature of the article is within the range of the glass transition temperature of the crystallizable polyester and 10° C. below the melt point of the crystallizable polyester, and C) applying a force to the article so as to increase the dimension of the article in at least one direction.

It is further disclosed that the polyamide polymer used in the process to make a stretch article is preferably MXD6 or nylon 6, with the interfacial tension reducing agent comprising a metal sulfonate and or lithium and that the amino to carboxyl end group ratio of the polyamide polymer be less than 0.20.

A process for making an article is also disclosed, said process comprising the steps of A) Drying a crystallizable polyester, wherein at least 85% of the crystallizable polyester's acid units are derived from the group consisting of terephthalic acid, 2,6 naphthalene dicarboxylic acid and their respective dimethyl esters; B) Drying a polyamide polymer comprised of a reaction product selected from the group consisting of the reaction product of amino caproic acid with itself and the reaction product of A-D where A is a residue of a dicarboxylic acid comprising adipic acid, isophthalic acid, terephthalic acid, 1,4 cyclohexanedicarboxylic acid, or naphthalenedicarboxylic acid and where D is a residue of a diamine comprising m-xylylene diamine, p-xylylene diamine, hexamethylene diamine, ethylene diamine, or 1,4 cyclohexanedimethylamine, wherein the amino to carboxyl end group ratio of the polyamide polymer is less than 1.0 when the relative viscosity of the polyamide polymer is less than 2.0, and less than 0.30 when the relative viscosity is in the range of 2.0 to 2.3 and less than 0.20 when the relative viscosity is greater than 2.3, C) Melt blending the crystallizable polyester, the polyamide polymer and an interfacial tension reducing agent selected from the group consisting of functionalized and non-functionalized interfacial tension reducing agents into a liquid; and D) Forming the liquid into an article selected from the group consisting of a sheet, a film, a preform, and a tube.

It is further disclosed that the polyamide polymer used to make the article is preferably selected from the group consisting of MXD6 and nylon 6, with the interfacial tension reducing agent comprises a metal sulfonate and or lithium and that the amino to carboxyl end group ratio of the polyamide polymer be less than 0.20.

It is further disclosed that the drying steps of the process of making the article are best done when the polyamide and the polyester are dried in the same vessel at the same time, with the preferred method of drying being conducted when the polyamide polymer and polyester are dried in the same vessel in the form of a compartmentalized pellet having at least two compartments wherein the first compartment is comprised of the polyester and the second compartment is comprised of the polyamide.

DETAILED DESCRIPTION OF THE INVENTION

Figure 1:
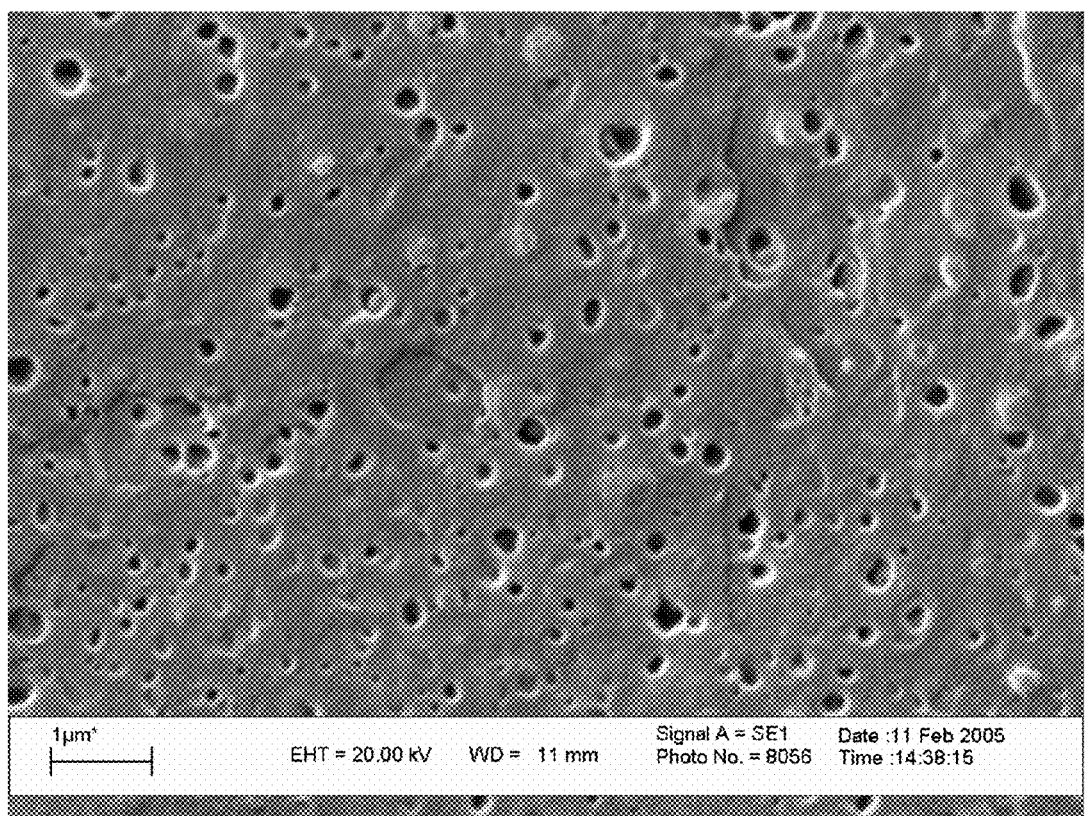
FIG. 1 depicts a scanning electron microscope photomicrograph (SEM) of polyamide domains dispersed in a polyester matrix in the absence of the interfacial tension reducing agent, such as lithium sulfoisophthalate derived from lithium sulfoisophthalic acid (LiSIPA). As detailed in the test method section, the sample was prepared by removing the polyamide with cold formic acid and exposing the sample to a scanning electron microscope.

The deficiencies of the colour and haze created when melt blending polyamides with polyesters can be significantly reduced when the polyester is melt blended with the polyamide in the presence of an interfacial tension reducing agent and the amino to carboxyl end group ratio of the polyamide is less than 1.0, but preferably less than 0.75, when the relative viscosity is less than 2.0 and an amino to carboxyl end group ratio of less than 0.30 when the relative viscosity is in the range of 2.0 to 2.3 and less than 0.20 then the relative viscosity is greater than 2.3. While the prior art teaches that haze increases when the polyamide has a low amino to carboxyl end group ratio the opposite has been found to occur when the melt blending is done in the presence of an interfacial tension reducing agent. In fact, the haze and colour formation are reduced as the amino to carboxyl end group ratio of the polyamide decreases.

It has been observed that the interfacial tension reducing agent combined with the polyester and polyamide as taught in this invention reduces the size of the domains of the polyamide dispersed in the unstretched polyester matrix over the prior art.

Because the composition increases the surface area of the polyamide, it is believed that this composition can be used to reduce the amount of polyamide used as an oxygen scavenger. However, to be used as an oxygen scavenger, the composition would need to contain a polyamide which reacts with oxygen. This is usually accomplished by adding a transition metal catalyst, usually a copper or cobalt compound, to the composition.

The polyamides suitable for this invention can be described as comprising the repeating unit of amino caproic acid or A-D, wherein A is the residue of a dicarboxylic acid comprising adipic acid, isophthalic acid, terephthalic acid, 1,4-cyclohexanedicarboxylic acid, or naphthalene dicarboxylic acid, and D is a residue of a diamine comprising m-xylylene diamine, p-xylylene diamine, hexamethylene diamine, ethylene diamine, or 1,4 cyclohexanedimethylamine.

These polyamides can also be described as the comprising at least one reaction product selected from the group consisting of the reaction product of amino caproic acid with itself and/or the reaction product of a residue of a dicarboxylic acid comprising adipic acid, isophthalic acid, terephthalic acid, 1,4-cyclohexanedicarboxylic acid, or naphthalene dicarboxylic acid with a residue of a diamine comprising m-xylylene diamine, p-xylylene diamine, hexamethylene diamine, ethylene diamine, or 1,4 cyclohexanedimethylamine.

Those skilled in the art will recognize many of the combinations as well known commercially available polyamides. The reaction product of the residue of sebacic acid with hexamethylene diamine is nylon 6.10 and the reaction product of the residue of adipic acid and hexamethylene diamine is nylon 6.6. Nylon 6.12 is another nylon which benefits from the invention. Nylon 6 is a special type of polyamide having the formula of $H_2N-(CH_2)_5-COOH$ and is made by the opening of caprolactam and then reacting or polymerizing the resulting amino caproic acid with itself. Nylon 6 is a suitable polyamide polymer, as is the reaction product of the residues of adipic acid and m-xylylene diamine, known as poly-m-xylylene adipamide. This composition is commercially known as MXD6 or nylon MXD6.

The polyamide could also be modified and would have a 0.01-15 mole percent of the respective acid or diamine replaced with an interfacial tension modifying compound such as sulfonated isophthalic acid, discussed below. U.S. Pat. No. 3,328,484 the teachings of which are incorporated by reference, herein, describes such modified co-polyamides.

The distinguishing feature of the polyamide used in the composition is that the ratio of the number of amino end groups to the number of carboxyl end groups be less than 1.0, preferably less than 0.51, preferably less than 0.20, and even more preferable less than 0.10. As demonstrated in the Experimental section, the lower the ratio, the better the results with the best experimental results being obtained at 0.0395, the lowest ratio tested. Thus, less than 0.03 is also preferred. If all the end groups were carboxyl end groups, the amino to carboxyl end group ratio would be at its minimum value of 0.0. This could be accomplished by reacting the amino end groups with an entity which would then place a different end group at the end of the polymer chain. This technique is known as end capping.

The ratio of the amino end groups to carboxyl end groups is also known as the amino to carboxyl end group ratio and is the number of amino end groups divided by the number of carboxyl end groups. For the equation to work the number of respective end groups must be expressed in the same units, e g mmol/kg or milliequivalents/kg (meq/kg, or even microEqu/g, and Equivalents/kg). Methods to quantify the number of the amino end groups and carboxyl end groups are well known in the art and are discussed in the test method section.

The molecular weight of the polyamide is not so critical, but the preferred number average molecular weight (Mn) in the range of 2,000 to 27,000, with one preferred range being about 13,000 to 27,000. However, the molecular weight more preferably in the range of about 5,000 to 16,000, and even more preferably 6,000 to 12,000, with a polyamide with a molecular weight in the range of about 8,500 to 10,000 being the most preferred.

Number average molecular weight can be determined by the equation 2,000,000 divided by the total number of end groups, where the total number of end groups is the number of amino end groups plus the number of carboxyl end groups expressed in milliequivalents/kilogram (meq/kg) or microequivalents/gm ($\mu eq/g$). In the case of the end capped polymer the molecular weight is 2,000,000 divided by the total number of end groups.

Relative viscosity (R.V.) is another measure of the length of the polyamide polymer chain. The relative viscosity (often denoted as $\eta_r$) is a synonym of "viscosity ratio" and is the ratio of the viscosity of a solution of the polymer (often denoted as $\eta$) to the viscosity of the solvent used (often denoted $\eta_s$). Its determination is detailed in the test method section. Suitable polyamides have a relative viscosity in the range from 1.4 to 2.9, with 1.5 to 2.3 being more preferred, 1.5 to 1.9 even more preferred, with 1.7 to 1.9 being the most preferred.

When the relative viscosity is greater than 1.84 (Mn>12, 000), the amino to carboxyl end group ratio can be less than 0.51, with 0.40 being more preferred, less than 0.20 even more preferred and less than 0.06 and less than 0.03 even more preferred.

For MXD6, the industry accepts that the number average molecular weight for the polyamide has been correlated to the relative viscosity by the equation $$Mn=16,200\times(R.V.-1.1)$$

where R.V. is the Relative Viscosity of the polyamide.

U.S. Pat. No. 6,239,233 describes how one can make the polyamide of this invention. According to U.S. Pat. No. 6,239,233 one can place a mixture of 178.7 g (1.224 moles, 2% molar excess) of adipic acid units and 210 g of distilled water in a 500 ml flask and then purge it for about 30 minutes with argon. Quickly, 163.4 g (1.2 moles) of m-xylylenediamine can be added to the flask. The flask should be equipped with an inlet for nitrogen, a metal stirrer, and a short distillation column. The flask is then placed in a Belmont metal bath preheated to 110° C. for 30 minutes. The temperature is then raised progressively to 275° C. over 60 minutes. The inventors of U.S. Pat. No. 6,239,233 report that if the solution is heated at 275° C. for 30 minutes, a low melt viscosity, clear polyamide can be obtained with an inherent viscosity of 0.458 (PM-95), amino end groups of 0.01 meq/g, COOH end groups of 0.22 meq/g and a melting endotherm of 238° C. This polyamide would have an amino to carboxyl end group concentration of 0.01 divided by 0.22, or 0.045. A polyamide with an amino to carboxyl end group concentration of 0.045 or less is suitable for this invention.

Several other techniques to make the polyamide follow: One preferred process is a batch process using a stirred steel autoclave operating at a pressure between 2 and 10 bars, preferably between 3 and 8 bars and especially preferred between 4 and 6 bars. A two step pressure profile is then applied. The raw materials are placed in the vessel and then heated to 120° C. inside the autoclave. After reaching a pressure of 2 bars, water is distilled off, until a ca. 90 w. % mixture is obtained. During distillation, the temperature is increased to 155-165° C. The mixture is then further heated until the desired pressure of 4 bars is reached. At 4 bars the remaining water is distilled off and temperature is increased to 245-250° C. Afterwards the pressure is reduced to atmospheric pressure. If the viscosity needed for pelletizing has not yet been reached one can use a post melt condensation phase at 245-265° C. under reduced pressure or nitrogen flow for 5-30 minutes. After reaching the proper viscosity the polyamide is discharged from the vessel as a strand through a water bath and is cut into pellets.

The temperature of the contents inside the autoclave should not exceed 265° C. during the whole condensation process. The relative viscosity measured after pelletizing is in the range between 1.45 and 1.70.

A suitable continuous process can be performed by heating salt solutions of adipic acid and meta-xylylene diamine at a temperature of 210 to 330° C., preferentially 250 to 300° C., more preferably 260 to 280° C., then preferably separating the prepolymer batchwise or preferably in a continuous way and recycling the separated meta-xylylene diamine. The prepolymer is then kept under a pressure between 1 and 20 bar, preferably between 1.5 and 15 bar, and most preferably between 4 and 6 bar at a temperature between 230 to 330° C., especially preferably between 260 to 280° C. and polycondensed.

Another process comprises heating a salt solution of the diamine and the dicarboxylic acid under a pressure between 2 and 10 bar, preferably 4 and 6 bar within a residence time of 60 seconds, with at least 95% degree of conversion and a maximum of 7 weight percent water. This polymer can be achieved by running the salt solution through a in sectioned tubular designed evaporation zone, in which by heating and water evaporation a two phase flow is developed; thereby driving the major amount of solution water into the gas phase. The used aqueous solutions have normally a monomer content of 30 to 70 w. %, preferably 45 to 65 w. %.

Yet another process consists of running the aqueous salt solution with a temperature of 50 to 100° C. batchwise or preferably continuously into an evaporation zone, where the salt solution is heated under a pressure of 2 to 10 bar, preferably 4 to 6 bar to a temperature of 250 to 300° C., preferably 260 to 280° C. The residence time in the evaporation zone is normally 1 to 300 seconds, preferably 30 to 120 seconds and especially preferred 30 to 60 seconds. At the exit of the evaporation zone the conversion ranges from 80 to 100%, preferably 90 to 99.5%, especially preferred 95 to 99%, particularly 96 to 98% and, depending on the pressure used, the water content is normally 0.01 to 10 w. %, preferably 0.1 to 5 w. %, with 1 to 3 w. % especially preferred. The evaporation zone is favourably designed as a pack of tubes, in which the diameter of the single tubes is periodically tubular or "split shaped" formed. Further it was proved to be advantageous to run the mixture of prepolymer and steam before separating the phases through a tubular "substance exchange zone", which is modified with fixtures. Here the pressure and temperature conditions of the evaporation zone are kept constant. The fixtures, for example, are carrier materials like Raschig rings, metal rings and especially carrier material made of wire gauze to create a large surface area. In this design, the phases, prepolymer and steam, come into close contact. This reduces the amount of meta-xylylene diamine set free by the steam. The residence time in this "substance exchange zone" is normally 1 to 5 minutes. The two phase mixture of steam and prepolymer is separated after leaving the evaporation zone and "substance exchange zone" respectively. The generated vapours contain water and traces of meta-xylylenediamine, which is liberated by the evaporation of the water. Thereby only extremely small amounts of meta-xylylene diamine are contained in the gas phase. (<0.1 w. % based on the polymer throughput). The vapours can be fed into a column and rectified to regain the meta-xylylene diamine. Appropriate columns are carrier material columns, bubble-cap columns or sieve-plate columns with 5 to 15 theoretical plates. The column is run under the same pressure conditions as the evaporation zone. Preferably the rectified meta-xylylene diamine is fed back to the polymerization zone.

The obtained prepolymers, which depending upon the degree of conversion of low molecular weight polyamide and low amount of non-converted salts, will normally have a relative viscosity=<1.2, are then introduced into the polymerization zone. In the polymerization zone, the obtained melt can be polycondensed at a temperature between 245 and 285° C., preferably between 255 and 275° C. and a pressure from 2 to 10 bar, especially from 4 to 6 bar.

In another process the obtained polyamide can be exposed to a discharge zone during simultaneous removal of rest water. Appropriate discharge zones are, for example, extruders. The melt, which is now liberated from (free of) water, can be pelletized. After polycondensation, the melt can be treated in any one of the well known post-treatments, for example, under water pelletizing (spherical and cylindrical chips) or strand pelletizing. The obtained resin can also be subjected to an extraction, which can be performed batchwise or continuously. Water, $C_1$-$C_8$-alkanols like methanol or ethanol can be used as extractants. Water is preferred. In one preferred process the polyamide is pelletized to spherical chips using under water pelletizing. The relative viscosity after leaving the extruder is in the range of 1.45 to 1.55.

The extracted polyamide can then undergo a solid phase (or solid state) polymerization (SSP) for final adjustment of the relative viscosity. This can be performed under vacuum or under an inert gas such as nitrogen or argon, preferably nitrogen. The temperature can vary over a range, normally between 120 and 230° C., preferably between 130 and 210° C., with 140 to 190° C. especially preferred.

The final relative viscosities after SSP are in the range of 1.55 and 2.00, preferably in the range of 1.60 to 1.9 and especially in the range of 1.65 and 1.75. After SSP the water content is usually less than 250 ppm.

It is noted that in the case of nylon 6, the end groups are by definition the same value. In order to create the high number of carboxyl end groups, one would have to react an additional dicarboxylic acid to the polymer which would raise the number of carboxyl groups while at the same time reducing the number of amino end groups.

In all of the above cases, it would be preferable to avoid the pelletizing step and combine the polyamide with the polyester by introducing the polyamide into a zone of a compartmentalized pellet with the polyester introduced into another. This pellet construction is described later.

The preferred amount of polyamides in the composition is between 1 and 15 parts per 100 parts of the polyesters plus polyamides in the composition, preferably between 3 and 8 parts per 100 parts of the polyesters plus polyamides in the composition, with the most utility occurring between 4 and 7 parts of polyamides per 100 parts of polyesters plus polyamides and 6 to 10 parts polyamides per 100 parts polyesters plus polyamides. The words polyesters and polyamides are used to indicate the fact that there may be more than one species of either the polyester or polyamide in the composition. Also as noted below, if the interfacial tension reducing agent is part of a polyester polymer chain, then the interfacial tension reducing agent is also a polyester and is included the calculation to determine the amount of "the polyesters" in the composition.

It is also contemplated to provide materials in a masterbatch where there is a highly concentrated amount of polyamide which is let down with polyester later. The masterbatch would contain between 50 and 95% be weight polyamide with the remainder being the polyester and interfacial tension reducing agent.

Polyesters suitable for this invention are the film forming polyesters made from the reaction of a diol with a dicarboxylic acid, or its corresponding ester. Various copolymers of multiple diols and diacids may also be used. Polyesters containing repeating units of only one chemical composition such as ethylene terephthalate are homopolymers. Polymers with two or more chemically different repeat units in the same macromolecule are termed copolymers. The diversity of the repeat units depends on the number of different types of monomers present in the initial polymerization reaction. In the case of polyesters, copolymers include reacting one or more diols with a diacid or multiple diacids, and are sometimes also referred to as terpolymers.

The term copolymer refers to any polymer with three or more monomers. In the case of PET, the homopolymer is polyethylene terephtalate made from terephthalic acid and ethylene glycol monomers. The addition of isophthalic acid, diethylene glycol, cyclohexane dimethanol or all of them make the PET a copolymer.

It is well known that the polymerization of the dicarboxylic acid with ethylene glycol will also have approximately 1 mole of diethylene glycol for the 100 moles of a dicarboxylic acid, 99 moles of ethylene glycol. This is because the di-ethylene glycol is formed in-situ, and although not charged directly into the reactor it will usually be present in the polymer. It is noted the primary repeating unit of polyethylene terephthalate is ethylene terephthalate, as it is found in the polymer chain. It is the reaction product of ethylene glycol with terephthalic acid or its derivative, the dimethyl ester of terephthalic acid, known as dimethyl terephthalate. The nomenclature follows with the other phthalates as well. Ethylene isophthalate has the glycol from ethylene glycol and the isophthalate acid moiety which is derived from isophthalic acid. This isophthalate moiety can come from or be derived from isophthalic acid or the dimethyl ester of isophthalic acid-dimethyl isophthalate; ethylene sulfoisophthalate is treated the same way with the sulfoisophthalate being derived from the corresponding sulfoisophthalic acid (SIPA) or the dimethyl ester of the sulfoisophthalic acid, dimethyl sulfoisophthalate (DMSI). As described below the DMSI is often added to the reactors as the bis-hydroxy ester of the sulfoisopthalate as well.

Suitable dicarboxylic acids include those comprising from about 4 to about 40 carbon atoms. Specific dicarboxylic acids include, but are not limited to, terephthalic acid, isophthalic acid, 2,6 naphthalene dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalene dicarboxylic diesters. Although the above list refers primarily to dicarboxylic acids, it is well known in the art that one can make the equivalent polyester from the corresponding dimethyl ester. Therefore, the phrase derived from a dicarboxylic acid includes polyesters manufactured using the dimethyl ester of the dicarboxylic acid; e.g. derived from terephthalic acid refers to the terephthalate moiety whether the polyester was manufactured using terephthalic acid or dimethyl terephthalate. The same nomenclature applies to the other monomers as well, such as sulfonates, isophthalates, naphthalates, and sulfoisophthalates.

These acids or esters may be reacted with an aliphatic diol preferably having from about 2 to about 24 carbon atoms, a cycloaliphatic diol having from about 7 to about 24 carbon atoms, an aromatic diol having from about 6 to about 24 carbon atoms, or a glycol ether having from 4 to 24 carbon atoms. Suitable diols include, but are not limited to, ethylene glycol, 1,4-butenediol, trimethylene glycol, 1,6-hexanediol, 1,4-cyclohexanedimethanol, diethylene glycol, resorcinol, and hydroquinone.

Polyfunctional comonomers can also be used, typically in amounts of from about 0.01 to about 3 mole percent. Suitable comonomers include, but are not limited to, trimellitic anhydride, trimethylolpropane, pyromellitic dianhydride (PMDA), and pentaerythritol. Polyester-forming polyacids or polyols can also be used. Blends of polyesters and copolyesters may also be useful in the present invention.

The esterification or polycondensation reaction of the carboxylic acids or esters with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred.

The polyesters of this invention may also contain small amounts of phosphorous compounds, such as phosphates, and a catalyst such as a cobalt compound, that tends to impart a blue hue. Also, small amounts of other polymers such as polyolefins can be tolerated in the continuous matrix. It has been discovered that while cobalt salts may be used to reduce colour formation and are taught by WO 2005/023530 A1, the use of cobalt salts is not necessary to reduce the colour formation when the polyamide has an amino to carboxyl end group ratio less than 0.81 and the interfacial tension reducing agent is the lithium salt (metal sulfonate), in particular lithium sulfoisophthalate, derived from lithium sulfoisophthalic acid (LiSIPA). Alternative colouring agents known in the art will also work. Thus the composition of this invention can be void of cobalt.

Another alternative to colorant addition is to add a stabilizer to the polyamide.

Polyesters of this invention can be prepared by virtually any polymerization procedure suitable for polycondensation polymers. The polyester polymers and copolymers may be prepared by melt phase polymerization involving the esterification, or corresponding transesterification of the diester of the monomers followed by melt phase polymerization vacuum. The melt phase polymerization can be done in a batch, continuous or semi-continuous manner, or even a combination.

After completion of the melt phase polymerization, the polyester is either made into a form such as a film or part or stranded and cut into smaller chips, such as pellets. The polyester is usually then crystallized and subjected to a solid phase (solid state) polymerization (SSP) step to achieve the intrinsic viscosity necessary for the manufacture of certain articles such as bottles. The crystallization and polymerization can be performed in a tumbler dryer reactor in a batch-type system. The solid phase polymerization can continue in the same tumble dryer where the polymer is subjected to high vacuum to extract the polymerization by-products Alternatively, the crystallization and polymerization can be accomplished in a continuous solid state polymerization process whereby the polymer flows from one vessel to another after its predetermined treatment in each vessel. The crystallization conditions are relative to the polymer's crystallization and sticking tendencies. However, preferable temperatures are from about 100° C. to about 150° C. In the case of crystallizable polyesters, the solid phase polymerization conditions are generally 10° C. below the melt point of the polymer. In the case of non-crystallizable polyesters, the solid phase polymerization temperature is 10° C. below temperature where the polymer begins sticking to itself. Traditional solid phase polymerization temperatures for crystallizable polymers range from about 200° C. to about 232° C., and more preferably from about 215° C. to about 232° C. Those skilled in the art will realize that the optimum solid phase polymerization temperature is polymer specific and depends upon the type and amount of copolymers in the product. However, determination of the optimum solid phase polymerization conditions is frequently done in industry and can be easily done without undue experimentation.

The solid phase polymerization is carried out for a time sufficient to raise the intrinsic viscosity to the desired level, which will depend upon the application. For a typical bottle application, the preferred intrinsic viscosity (I.V.) is from about 0.65 to about 1.0 deciliter/gram, as determined by the method described in the methods section. The time required to reach this I.V. from about 8 to about 21 hours.

One suitable class of polyesters for the practice of this invention is the crystallizable terephthalate or naphthalate polyesters defined as a polyester with more than 85 mole % of its acid units being derived from terephthalic acid or 2,6 naphthalene dicarboxylic acid or their respective dimethyl esters. It is generally accepted that to keep the polymer crystallizable the comonomer content is usually kept below about 15 to 20 mole %.

The term crystallizable polyester means that the polyester, such as polyethylene terephthalate can become semi-crystalline, either through orientation or heat induced crystallinity. No plastic is completely crystalline and the crystalline forms are more accurately described as semi-crystalline. The term semi-crystalline is meant to describe a polymer that exhibits X-ray patterns that have sharp features of crystalline regions and diffuse features characteristic of amorphous regions. It is well known in the art that semi-crystalline should be distinguished from the pure crystalline and amorphous states.

One preferred crystallizable polyester is PET, which is the group of polyesters consisting of polyethylene terephthalate, copolymers of polyethylene terephthalate including copolymers of polyethylene terephthalate modified with metal salt of sulfoisophthalate derived from the di-ester or di-carboxylic acid of sulfoisophthalate (SIPA) in the approximately 1:1 stoichiometric reaction of acids, or their di-esters, with ethylene glycol.

Specific copolymers of interest are the crystallizable polyethylene terephthalates which have at least one sulfoisophthalate as an acid moiety and at least one other acid moiety derived from the comonomers selected from the group consisting of isophthalic acid or its diester, 2,6 naphthalene dicarboxylic acid or its diester, and cyclohexane dimethanol. The preferred sulfoisophthalate is lithium sulfoisophthalate with the levels of lithium sulfoisophthalate within the range of 0.05 and 2.0 mole percent based upon the acid moieties of the polyesters in the composition. While greater than 2.0 mole percent is not deleterious to the intended effect, greater than 2.0 mole percent achieves little or no additional improvement.

Another preferred crystallizable polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. In addition to the interfacial tension reducing agent such as the metal salt of sulfoisophthalic acid, other aromatic and aliphatic acids which may be used simultaneously to make a copolymer include, for example, isophthalic acid and sebacic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis(acetylacetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

Another preferred crystallizable polyester is polyethylene naphthalate, also known as PEN. It is made by the reaction of 2,6 naphthalene dicarboxylic acid or its diester (2,6 dimethyl naphthalate) with ethylene glycol.

It is also contemplated that the crystallizable polyester of the present invention may comprise recycled polyester or materials derived from post consumer or post industrial recycled polyester, such as polyester monomers, catalysts, and oligomers.

It is essential for this invention that the composition contains at least one interfacial tension reducing agent which reduces the interfacial tension between the polyester and the polyamide. In order to understand the criticality of the interfacial tension reducing agent, it is necessary to understand the role of the interfacial tension reducing agent plays in the polyester-polyamide dispersion.

The polyester-polyamide dispersion can be described as a multi-phase system consisting of a dispersed polymer and a matrix phase polymer. The dispersed polymer is the discontinuous phase, with many small particles scattered throughout the matrix polymer. The matrix polymer is a continuous phase, where the polymer is not broken up into discrete units, but is constantly in contact with itself. In other words, there is usually only one matrix phase, but many particles of the dispersed polymer. Technically, therefore, the dispersed component may be considered many phases, as each particle is its own phase. However, in that description, each particle has the same equilibrium properties of the other particle. For the purposes of this invention, the term dispersed phase or dispersed polymer refers to the totality of discrete particles of the discontinuous component present in the continuous phase.

It is believed that the polyamide is dispersed into the polyester matrix forming discrete particles in the polyester. And, while not to be bound by any theory, it is also believed that the inferior dispersion of polyester/polyamide system is due to the high interfacial tension (IFT) existing between the two polymers.

For a closed system (see An Introduction to the Principles of Surface Chemistry, Aveyard, R. and Haydon, D. A. 1973), the differential expression for the internal energy U of the system has been described as $$dU = dQ + dW$$

where dQ is the heat taken up by the system and dW is the change in work. The relation is then isolated for dW which reduces the equation to $$dW = -pdV + \gamma dA$$

where dV is the change in volume and $\gamma$ is the interfacial tension, and dA is the change in interfacial area (the area of the interface between the two components). In the liquid-liquid system, such as exists with the mixture of melted polyester/polyamide, there is no volume change (dV=0), and the equation reduces to the change in work as a function of the interfacial tension and the change in interfacial area.

$$dW = \gamma dA$$

The lower the interfacial tension, therefore, the higher the area of contact between the two materials. A higher area of interfacial contact for a given amount of material is only achieved by creating smaller particles of the dispersed material into the matrix material. A higher interfacial contact area requires a smaller diameter, and consequently a greater number of particles. The effectiveness of the interfacial tension reducing agent can be directly established by the average particle size. The lower the average dispersed particle size, the lower the interfacial tension and the more effective the interfacial tension reducing agent.

This increase in surface area and corresponding decrease in domain size and subsequent increase in the number of domains is believed to increase the barrier, improve the aesthetics (reduced haze) and also increase the amount of oxygen scavenging ability when the polyamide has been activated to react with oxygen. This activation is often done by exposing the polyamide to a transition metal catalyst, usually in its positive valence state.

Other ways to increase the surface area exist. These include increasing the amount of shear during the melt blending process, varying the viscosity ratios, attempting to cross link or graft the materials. While the inventors are familiar with all of the above techniques, no technique has been as successful as directly modifying at least one of the polymers to reduce the interfacial tension between the two polymers.

The interfacial tension between two polymers in their liquid state is difficult to determine due to the high temperatures involved. One technique is to use a spin tensiometer. However, in the absence of sophisticated equipment it is much easier to make two separate polymer dispersions, one modified, the other unmodified, using the same amount of work (torque, screw design, temperatures) and compare the difference in average particle size of the dispersed material.

The immediate effect of the reduction in interfacial tension can be seen by reducing the haze caused by the nylon domains in the stretched article or by comparing the average polyamide particle size of an unmodified polyester-polyamide dispersion with a modified polyester-polyamide system. Comparing the average domain sizes easily determines whether the interfacial tension has been reduced. It is noted that some of the interfacial tension reducing agents create an inherent haze themselves, so care must be taken using haze as indicator of the effectiveness of the interfacial tension reducing agent. If the practitioner uses haze as the indicator, the practitioner must compare the haze at varying levels of nylon with the haze of a control with no nylon.

It is necessary that the composition have an effective amount of interfacial tension reducing agent existing either separately in the composition or reacted into the polymer chain of the polyester, polyamide or both. A combination of the separate interfacial tension reducing agent and a polyester or a polyamide, or both being modified with an interfacial tension reducing agent are contemplated. The interfacial tension reducing agents need not be the same. Combinations are also contemplated Preferably, the interfacial tension reducing agent is derived from a co-monomer that has been reacted into the polymer chain. To be a co-monomer, the interfacial tension reducing agent is functionalized with at least one end group which allows the interfacial tension reducing agent to react with at least one of the other polymers or polymer co-monomers in the composition.

In the case of polyesters, these can be the polar co-monomers used to create polyester ionomers. In the case of polyamides, the interfacial tension reducing agent can be the polar co-monomers used to create polyamide ionomers. Examples of these co-monomers are the monovalent and/or divalent salt of the respective sulfonate described in U.S. Pat. No. 6,500,895 (B1) the teachings of which are incorporated herein. Also included are the monovalent and bivalent metal salts described in the following formulas found in Japanese Patent Application 0 3281246 A, the teachings of which are incorporated herein.

One way to describe the various metal salts is to use the term functionalized metal sulfonate to describe a compound of the form R—$SO_3$M, where M is the metal ion and R is an aliphatic, aromatic, or cyclic compound with at least one functional group that allows the functionalized metal salt to react with the polyester or polyamide, or their respective monomers or oligomers where M designates the metal ion. Functionalized metal sulfonates included in this invention are the lithium and sodium salts of sulfonated comonomers, including aliphatic and aromatic alcohols, carboxylic acids, diols, dicarboxylic acids, and multifunctional alcohols, carboxylic acids, amines and diamines. In contrast, non-functional metal sulfonates are those of the R—$SO_3$M, and R does not have functional group. The phrase metal sulfonate therefore refers to both functional and non-functional metal sulfonates. An example of this sulfonated polystyrene or polyolefins which are known to act as interfacial tension reducing agents in the polyester-polyamide systems.

In general, the interfacial tension reducing agent exists in functionalized form of the form X—R, where X is an alcohol, carboxylic acid or epoxy, most preferably a dicarboxylic acid or diol and R is R is —SO₃M, —COOM, —OM, —PO₃(M)₂, with M being a metal in a +1 or +2 valence state which can be selected from the group consisting of Li, Na, Zn, Sn, K and Ca and X—R is copolymerized into the polyester polymer to modify the interfacial tension. The amount of X—R needed will exceed 0.01 mole percent with respect to the total number of respective dicarboxylic acid or diol moles in the polymer composition. It is possible for X—R to include both a diol or dicarboxylic acid. In that case, the mole percent is based upon the total number of moles of respective diols, dicarboxylic acids, or polymer repeating units.

The functionalized interfacial tension reducing agent may contain 2 or more R groups. R is combined directly to the aromatic ring of X, which could be a diol, a dicarboxylic acid, or a side chain such as a methylene group. The following structure is an example,

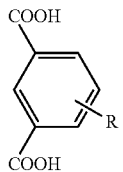

Where R is —SO₃M, —COOM, —OM, —PO₃(M)₂ with M designating a metal in a +1 or +2 valence state which can be selected from the group consisting of Li, Na, Zn, Sn, Ca and K. When R is —SO₃M, the compound is known as sulfonate, an organic sulfonate, or more specifically, sulfoisophthalic acid. If this entity is the interfacial tension reducing agent, then the polyester would contain acid units derived from a metal salt of sulfoisophthalic acid, wherein the metal can be selected from the group consisting of lithium, sodium, zinc, tin, calcium and potassium.

The dicarboxylic acids represented by X may be each ortha, meta, or para. They comprise for instance aromatic dicarboxylic acids such as terephthalic acid, isophthalic acid, orthophthalic acid, naphthalene dicarboxylic acid, diphenylether dicarboxylic acid, diphenyl-4,4-dicarboxylic acid etc.

X may also be aliphatic. In that event, aliphatic dicarboxylic acids such as oxalic acid, malonic acid succinic acid, glutaric acid, adipic acid, pimelic acid, suberic acid, azelaic acid, sebacic acid, etc. are suitable. Cycloaliphatic dicarboxylic acids such as cyclohexanedicarboxylic acid and one or more species of these can be used. Also included is isethionic acid. Specifically contemplated are mixtures of the dicarboxylic acids as well.

X can also represent an alcohol, preferably a diol of the structure:

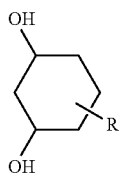

Where R is —SO₃M, —COOM, —OM, —PO₃(M)₂ where M is a metal in a +1 or +2 valence state which can be selected from the group consisting of Li, Na, Zn, Sn, K, and Ca.

The diols represented by X may also be aliphatic glycols such as ethylene glycol, 1,3 propanediol, 1,4-butanediol, 1,5-pentanediol, 1,6-hexanediol, 1,9-nonanediol, diethylene glycol, trimethylene glycol and cycloaliphatic diols such as cyclohexane diol, cyclohexanedimethanol and one or more species in combination can be used. Among these, ethylene glycol, diethylene glycol and cyclohexanediol are preferred.

Other functionalized interfacial tension reducing agents which can be used to decrease the interfacial tension include hydroxyl terminated polyethers, such as polyethylene glycol (Carbowax) and cyclic amides such as ethoxylated dimethyl hydantoin. In addition, polyesters can be reacted with epoxy terminated compounds, including epoxy terminated polyethers, to produce a polyether side chain attached to the polymer.

While many metals work and the prior art teaches that bi-metals are preferred, it has unexpectedly been discovered that lithium, a monovalent metal, performs much better than sodium. In fact, the lithium salt produces a dispersion with average domains lower than levels previously measured. As described below, the lithium sulfoisophthalate without a cobalt compound has better colour than the sodium sulfoisophthalate blended with the same amount of MXD6 in the presence of a cobalt salt as described in WO 2005/023530 A1, the teachings of which are incorporated herein. Therefore a composition void of cobalt is one embodiment of the composition, articles, and processes claimed. As demonstrated by the experimental results of this specification, when the article containing the composition is stretched, the polyamide domains dispersed in the polyester matrix in the presence of the lithium salt do not stretch as much as the polyester matrix. This means that in the stretched article, there are far fewer domains have a diameter falling in the range of visible light (approximately 400 nm to 700 nm).

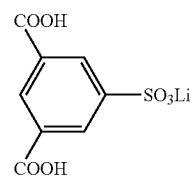

Lithium Sulfoisophthalic Acid (LiSIPA) or Sulfonic Acid Lithium Salt Modified Isophthalic Acid Of the salt forms, the di-carboxylic acid, di-ester, or prereacted low molecular weight oligomers such as the bis-hydroxyethyl ester of lithium sulfoisophthalate are preferred. It is also possible that the interfacial tension reducing agent, in this case the lithium sulfonate, occur in the diol form as well. Possible alternatives are ethylene glycol with the sulfonate group at the end of the pendant chain. It has even been proposed to place the sulfonate at the end of the polyester molecule. This can be accomplished by reacting or copolymerizing the polyester with the sulfonated salt of benzoic acid or other monofunctional species such as isethionic acid, either in the melt reactor or in an extruder.

In order to be reacted into, also known as copolymerized with, either polymer, the modifying agent must have at least one functional group. Examples of these functional groups are carboxylic acid (—COOH), alcohol (—OH), the ester of the carboxylic acid, epoxy termination, the diamine, or amine end groups.

Because a high I.V. polyester would have two functional end groups, a high I.V. polyester containing a metal sulfonate in its backbone is an interfacial reducing agent when blended with a polyamide and polyester that does not contain a metal sulfonate. Should the high I.V. polyester have both ends terminated, it would be considered a non-functionalized interfacial tension reducing agent.

The non-functionalized interfacial tension reducing agents are those compounds which contain the polar group, in particular the lithium salt, but do not have any functional end groups which allow the interfacial tension reducing agent to react with the polyester or polyamide. The lithium salt of sulfonated polystyrene is an example. In the three component system, the mole percent of the interfacial tension reducing agent is the mole percent based upon all the acid groups of the polyester.

As taught below, the polymer is preferably modified with the interfacial tension reducing agent. This modification is done by copolymerizing the interfacial tension reducing agent into the polymer chain.

The composition can comprise the critical elements which exist in a two component form. In addition to the two critical components, other compounds may, of course, be present in the composition. In one embodiment of the two component form, an interfacial tension reducing agent is copolymerized with the polyester polymer to make the polyester both a polyester and an interfacial tension reducing agent. Thus the single polyester molecule contains two elements of the claimed invention—a polyester and an interfacial tension reducing agent. The polyamide could be void of an interfacial tension reducing agent. Alternatively an interfacial tension reducing agent can also be incorporated into the polyamide. In another embodiment of the two component form, the interfacial tension reducing agent is copolymerized with the polyamide polymer to make the polyamide both a polyamide and an interfacial tension reducing agent. Thus the single polyamide molecule contains two elements of the claimed invention—a polyamide and an interfacial tension reducing agent. The polyester could be void of an interfacial tension reducing agent. Alternatively an interfacial tension reducing agent can also be incorporated into the polyester.

The critical elements of the composition can also be present as more than two components. Again, in addition to the critical components, other compounds may, of course, be present in the composition. For instance, one embodiment is a polyester without an interfacial tension reducing agent copolymerized with the polymer, a polyester with an interfacial tension reducing agent copolymerized with the polymer, and the polyamide without an interfacial tension reducing agent copolymerized with the polyamide. Another embodiment is a polyester without an interfacial tension reducing agent copolymerized with the polymer, a polyester with an interfacial tension reducing agent copolymerized with the polymer, and a polyamide with an interfacial tension reducing agent copolymerized with the polyamide. Another embodiment is a polyester without an interfacial tension reducing agent copolymerized with the polymer, a polyester with an interfacial tension reducing agent copolymerized with the polymer, a polyamide with an interfacial tension reducing agent.copolymerized with the polyamide and a polyamide without an interfacial tension reducing agent.copolymerized with the polyamide. As can be seen by the described embodiments, the interfacial tension reducing may be a third component, such as sulfonated polystryrene, a polyester or a polyamide; may be copolymerized with the polyester and/or the polyamide.

It is preferred that for low molecular weight polyamides having a number average molecular weight, Mn, less than or equal to 12,000 (R.V. less than or equal to 1.84) that only a portion of the interfacial tension reducing agent be copolymerized with the polyamide polymer. Put another way, at least a portion of the interfacial tension reducing agent is not copolymerized with the polyamide polymer when the molecular weight is less than or equal to 12,000 or the relative viscosity of the polyamide polymer is less than 1.84. More specifically, at least some of the moieties derived from lithium or sodium sulfoisophthalic acid must not be copolymerized with the polyamide polymer when the molecular weight is less than or equal to 12,000 or the relative viscosity of the polyamide polymer is less than 1.84. The moities not copolymerized with the polyamide are preferably copolymerized with the polyester.

While often there is no upper limit to the amount of interfacial tension reducing agent, levels of the interfacial tension reducing agent needed to decrease the interfacial tension range from 0.01 mole percent to 15 mole percent with respect to the total number of moles of the respective acid or diol moiety in the composition. For example, a typical homopolymer polyester has 100 mole percent terephthalate derived from terephthalic acid and almost 100 mole percent ethylene derived from ethylene glycol, with the remaining glycol being diethylene derived from diethylene glycol which is derived in situ during the manufacturing process. A 100 moles of polymer with 5 mole percent of the ionic dicarboxylic acid co-monomer, such as lithium sulfoisophthalic acid would contain 95 moles of terephthalate derived from terephthalic acid, 5 moles lithium sulfoisophthalate and approximately 100 moles of ethylene derived ethylene glycol. Similarly, it may be advantageous to use another comonomer such as isophthalic acid. For example, if one could substitute 2 moles of the terephthalate with 2 moles of isophthalate and create a polymer with 2 moles isophthalate, 93 moles terephthalate, 5 moles sulfoisophthalate and approximately 100 moles ethylene to make 100 moles of polymer repeat unit.

In the three component blend system, the moles of acid are the moles of acid in the modified polymer plus the moles of acid in the compatible unmodified polymer. For example, if there were two polyesters present, one containing sulfoisophthalate, and the other did not, the mole percent of the sulfoisophthalate would be the moles of sulfoisophthalate divided by the moles of acid moieties of the two polyesters added together.

It is also well known that di-ethylene glycol is formed in-situ in the manufacture of polyester and about 1-3 percent of the total moles of glycol derived repeat unit will be diethylene derived from diethylene glycol. Therefore, the polyester compositions are typically 97 mole percent ethylene and 3 mole percent di-ethylene.

The amount of interfacial tension reducing agent is determined empirically. Generally, a small amount is needed and approaches a critical amount beyond which additional amounts have no affect. In the surface science field, this amount is referred to as the Critical Micelle Concentration (CMC). As seen in the examples, a small amount of sulfonated material has a significant effect, but at a certain amount, around 0.4 or 0.7 mole percent of the acid moieties in the case of lithium sulfoisophthalate derived from lithium sulfoisophthalic acid, no increase in effectiveness is seen by increasing the amounts of the interfacial tension reducing agents. Levels above the CMC would be the functional equivalent of the CMC as it pertains to reducing the interfacial tension of the polyester-polyamide. Unlike other salts, the lithium salt, in particular shows an optimum level at approximately between 0.3 and 1.0 moles per 100 moles polymer repeat unit. This can also be expressed as 0.4 to 1.0 mole percent of the acid or glycol moiety to which the lithium salt is attached.

Typical levels for a metal sulfoisophthalate derived from the metal sulfoisophthalic acid are in the range of about 0.01 to about 15 mole percent, with the range of about 0.05 to about 10 mole percent being more preferred, with the range of about 0.1 to 5 mole percent also preferred, with the range of about 0.2 to about 4 mole percent and about 0.4 to about 2 mole percent also being good operational ranges. The amount of sulfonate interfacial interfacial tension reducing agent is determined by measuring the amount of sulphur in the polymer and metal. For the case of the sulfonates belonging to the class of isophthalates, they can be described as being a metal sulfoisophthalate derived from the metal sulfoisophthalic acid or glycol, wherein the metal is selected from the group consisting of lithium, sodium, potassium, calcium, zinc, and manganese.

Polyesters modified with the interfacial tension reducing agent employed in the present invention can be prepared by polymerization procedures. The traditional techniques can be divided into the ester, acid, and modified processes. In the ester process, the dimethyl ester of the carboxylic acid or acids is reacted with the glycol or glycols in the presence of heat and the methanol removed yielding the bis-hydroxyethyl ester of the acids. The bis-hydroxyethyl ester is then polymerized in its liquid form by subjecting the material to vacuum and heat to remove the glycols and increase the molecular weight. A typical process for the object polymer with an interfacial tension reducing agent would start with these ratios: 98 moles of dimethyl terephthalate, 2 moles of dimethyl sodium salt of sulfoisophthalate and 220 moles of glycol, typically ethylene glycol. Of the 220 moles of glycol, 120 are excess which are removed during processing. It should be noted that it is possible to obtain the sulfonated co-monomer in either its bis-(hydroxyethyl) or dimethyl ester form.

For clarification, the phrase copolymerized with at least X percent of a specific acid means that the compound is considered as part of the acid group of the polymer, such as terephthalic or isophthalic acid. It provides the reference to determine how many moles of the compound to use. The phrase does not mean that the compound must be added to the process as an acid. For example, lithium sulfoisophthalic acid could be copolymerized into polyethylene terephthalate as the acid with two carboxylic end groups, as the dimethyl ester of the carboxylic acid, as the bis-hydroxy ester of the dimethyl ester, as very low molecular weight oligomers of a glycol acid polymer where the acid moieties are at least in part, the sulfoisophthalate salt, or as the di-alcohol.

The phrase "copolymerized salt of the acid" should not limit the claim to only using the acid form, but should be read to mean that the compound is one of the acid derived groups in the polymer.

The phrase "copolymerized with" means that the compound has been chemically reacted with the polymer, such as in the polymer chain or as a pendant group. For example, a polyester copolymerized with lithium sulfoisophthalate, or modified by copolymerizing at least 0.01 mole percent sulfoisophthalate into the polyester, means that sulfoisophthalate is bonded to the polymer, including bound into the polymer chain, with at least one chemical bond. The phrases are indifferent to how the material is incorporated into the polymer. A polyester copolymerized with lithium sulfoisophthalate, or modified by copolymerizing at least 0.01 mole percent lithium sulfoisophthalate into polyester refers to a polyester containing the lithium sulfoisophthalate whether that lithium sulfoisophthalate was incorporated using but not to limited to lithium sulfoisophthalic acid, lithium sulfobenzoic acid, the dimethyl ester of lithium sulfoisophthalic acid, the methyl ester of lithium sulfobenzoic acid, the di-alcohol of lithium sulfoisophthalate, the lithium sulfohydroxy benzene, the lithium salt of hydroxy benzene sulfonic acid, or oligomers or polymers containing the lithium sulfoisophthalate.

While the preceding paragraph used lithium as an example, the same would be true for the sodium and other metal salts. It should be noted that the references to lithium in this specification should not limit the claims to just the lithium salt. While lithium is the preferred metal, the use of the polyamides within the specified amino to carboxyl (acid) end group ratio has been effectively demonstrated with other metals as demonstrated in the examples.

The phrases "and derivatives" and "and its derivatives" refer to the various functionalized forms of the interfacial reducing agent which can be copolymerized into the polymer. For example, lithium sulfoisophthalate "and its derivatives" refers collectively and is not limited to lithium sulfoisophthalic acid, the dimethyl ester of lithium sulfoisophthalic acid, the bis-hydroxyethyl ester of lithium sulfoisophthalic acid, the di-alcohol of lithium sulfoisophthalate, low molecular weight oligomers, and high I.V. polymers containing lithium sulfoisophthalate in the polymer chain.

The same nomenclature applies to the glycol or alcohol containing the interfacial tension reducing agent.

In the acid process, the starting materials are the di-carboxylic acids, with water being the primary by-product. The charge ratio in a typical acid process is 98 moles terephthalic acid, 2 moles of a metal salt of sulfoisophthalic acid (e.g. lithium sulfoisophthalic acid—LiSIPA), and 120 moles of glycols, typical ethylene glycol. After reaction of the glycols with the acids, the material is subjected to the same polymerization process conditions as the ester process. In practice, many of the salts degrade and are therefore added in as a pre-reacted bis-hydroxy ester form as described in the examples.

The modified processes are variations of either process; combining the intermediary product at certain steps. For example, the acid process may be used with just terephthalic acid to produce its low molecular weight intermediate and the ester process used to produce the bis-hydroxyethyl ester of the homopolymer sulfonated polyester. These two intermediates are then combined and polymerized to a more random copolymer. Another variation is to add the finished modified polymer to the melt reactor and let the melt process depolymerise the modified polymer and then form a random copolymer. While the three component system, of PET, PET-ionomer, and polyamide has not been found to be as effective as the more random copolymer of the two component system (PET-ionomer, polyamide), the three component system is considered a part of this invention.

Another technique for manufacturing the modified polymer is to completely trans-esterify a modified polyester with a large amount of interfacial tension reducing moieties into a unmodified polyester to create a blockier copolymer. This can be done using other techniques such as a long residence time and/or high temperature extrusion.

Other methods of incorporating similar co-monomers are listed in U.S. Pat. Nos. 3,936,389, 3,899,470, 5,178,950, and United States Statutory Invention Registration H1760, the teachings of all of which are incorporated herein.

In the process of making the composition, the polyester, polyamide, and interfacial tension reducing agent are melt blended by any of the known techniques and then molded, formed or cast into an article. Melt blending involves heating the separate materials so that at least the polyester and the polyamide are liquid and exposing the liquids to shear stress. This can occur in an extruder or a heated vessel and can be done continuously or in a batch operation. If the interfacial tension reducing agent is not bound into the polyamide or polyester, the temperature should be sufficient to liquefy it as well. The actual blending could occur in a stirred vessel or extruder, such as injection molding machine. After the material is melt blended it is shaped into an article.

Examples of the articles are films, fibers, pellets, preforms, and injection molded shapes. Often these articles are further treated to make a different article such as a bottle, container, tray, or stretched film. In some cases, the composition is introduced as a layer in the article and becomes a layer in the final produced article.

To make the article, the melt blend will pass through a nozzle or die. In the case of films or sheets, the blended composition is pushed through a die and usually onto a roll. In the case of a preform or injection molded part, the melt blended composition is pushed into the mold and takes the shape of the mold. In the case of the pellet, the melt blended composition is pushed through a hole making a strand that is cut. In the case of the fiber, the strand remains uncut and is wound onto a bobbin.

Because the polyamide and polyester are both hydroscopic, it is preferable to dry both of them prior to melt blending. In general, neither material should contain more than 250 ppm water when melt blending. However, the final amount of moisture removed from the materials prior to drying is up to the practitioner. Therefore, for the purposes of this specification, the verb drying, or to dry, or drying, or drying step refers to removing moisture from the polymer when the polymer is below its melt point. Drying does not refer to removing moisture in contact with the polymer, such as surface moisture during pelletizing. Drying does not refer to removing moisture to at or below a specified level. It is merely the removal of moisture below the melt point. Drying is done most efficiently by exposing the polymer, generally in the form of pellets, to a high temperature, but below the melt point of the polymer, in the presence of dehumidified air or inert gas such as nitrogen. Generally, drying will remove 50% or more of the moisture present in the polymer.

One technique is to dry the polyester and/or the polyester with the interfacial tension reducing agent separately from the polyamide and then melt blend the components in the same extruder. Another expression is to dry the polyester in the absence of any polyamide, or dry the polyester in a vessel void of polyamide. While some polyamide could be tolerated with the polyesters, the level should not exceed 1 percent by weight of the polymers in the drying vessel. Thus, the polyester could be dried in a vessel substantially void of any polyamide, where substantially void means that there is less than 1 percent polyamide by weight of the vessel contents. This type of drying could be done in the same vessel, just at different times; or the drying could be done in two separate vessels. It is even possible to dry the material in one location, package the material in moisture tight containers and use the material at a different location. This is often referred to as pre-drying and is a drying technique contemplated.

One may only dry the polyester or only dry the polyamide.

WO 2005/110694 A1 teaches that the most efficient way to dry the polyamide and polyester is to do so together in the same vessel. However, simultaneously drying polyester in the presence of polyamide creates colour formation. WO 2005/110694 A1, also published as United States Patent Application 20050261126, the teachings of which are incorporated in its entirety, teaches to use and make the compartmentalized pellet with at least two zones, with the first zone comprising the polyesters and the second zone comprising the polyamides to minimize colour formation during drying. FIGS. 5 through 8 demonstrate different embodiments of a compartmentalized pellet.

Figure 5:
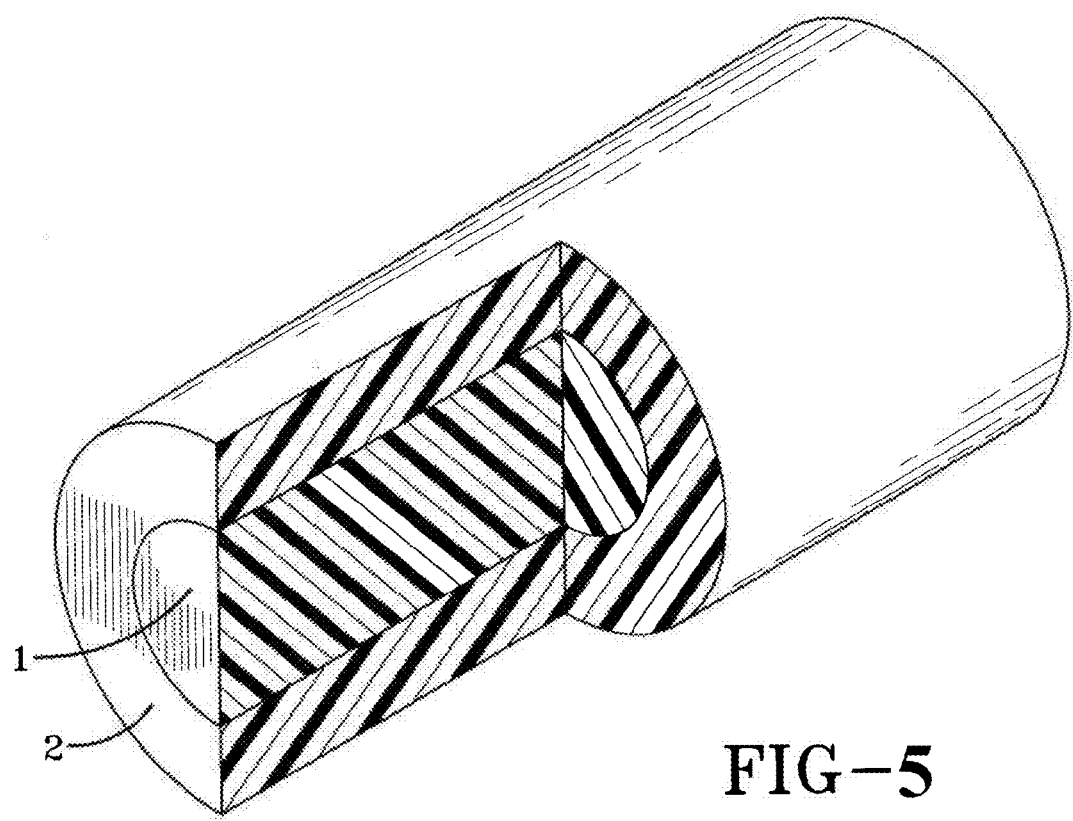
FIG. 5 depicts a resin pellet with two compartments or zones in the core-sheath configuration.
Figure 6:
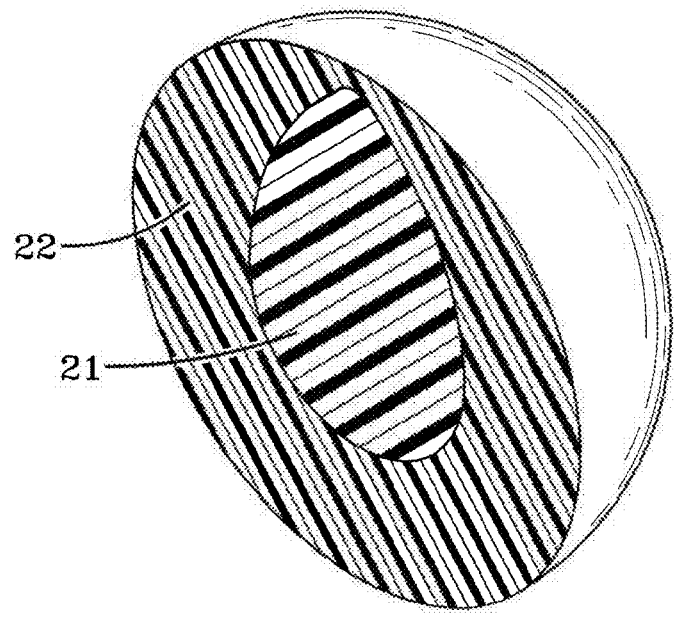
FIG. 6 depicts a resin pellet with two compartments or zones in the core-sheath configuration where the core is encapsulated, surrounded, or enclosed by an outer sheath layer.
Figure 7:
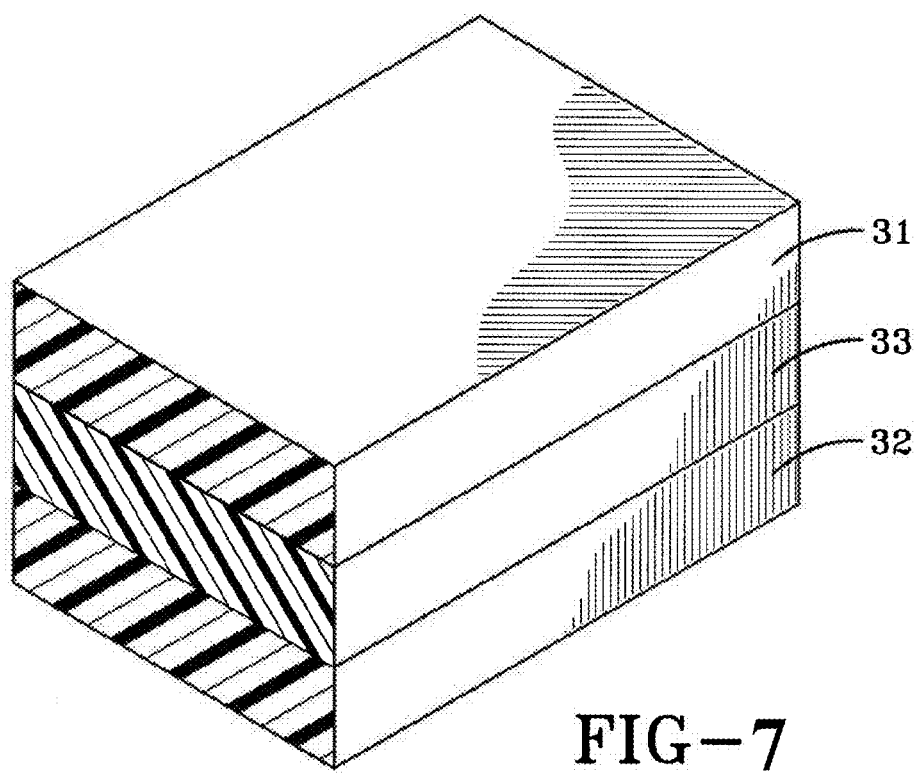
FIG. 7 depicts a resin pellet with three compartments or zones in a multi-layered or sandwich configuration.
Figure 8:
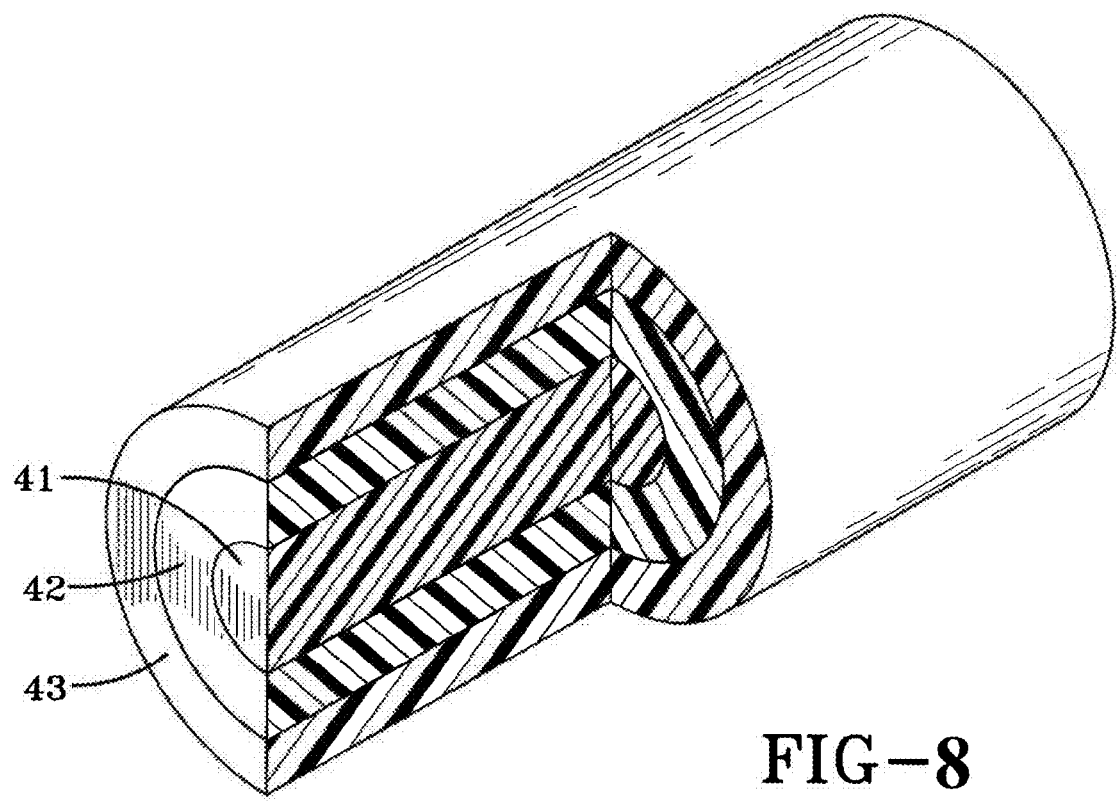
FIG. 8 depicts a resin pellet of three compartmentalized zones configured in two concentric layers surrounding a core.

In the three component system, the compartmentalized construction would be used by placing the polyester in one compartment, preferably the sheath as depicted by numeral 2 in FIG. 5 and numeral 22 in FIG. 6, the polyamide in another compartment, preferably the core as depicted by numeral 1 in FIG. 5 and numeral 21 in FIG. 6, with the interfacial tension reducing agent present any compartment. The components are then blended to produce the composition when the compartmentalized pellet is melt extruded. It is noted that complete separation of the polyester and polyamide is not essential for the compartmentalized construction.

To be a compartmentalized pellet, the volume of the compartment must be at least 0.001 percent of the total volume of the pellet. In practicality, 0.01 volume percent is more preferred, with at least 0.1 volume percent the most preferred. The percentage of the volume of the compartmentalized zone (core) relative to the whole pellet is the ratio of the radius of the core squared to the radius of the cylindrical portion of the pellet squared.

A preferred embodiment is the core-sheath design wherein the core comprises m-xylylene adipamide polyamide (MXD6) and the sheath comprises a polyester, specifically crystallizable polyethylene terephthalate with an Intrinsic Viscosity (I.V.) between 0.4 and 1.2 dl/g.

The preferred process of melt blending the components comprises drying a compartmentalized pellet, wherein the pellet has a first compartment and a second compartment, where the first compartment of the pellet comprises the polyester and the second compartment comprises the polyamide. The interfacial tension reducing agent, preferably a metal sulfonate salt such as lithium sulfonate, lithium sulfoisophthalate or sodium sulfoisophthalate can be present in either compartment, a different compartment or the interfacial tension reducing agent can be added separately during melt extrusion.

If the interfacial tension reducing agent is incorporated into the backbone of, or copolymerized with the polyester molecule, then the interfacial tension reducing agent would be present in the compartmentalized pellet in the compartment containing the polyester, since the polyester is both the polyester with the interfacial tension reducing agent incorporated into its backbone. Alternatively, the compartmentalized pellet may contain the polyester in a sheath and the polyamide in the core, with the interfacial tension reducing agent being present in a separate form. In the case of a two pellet system, the pellet containing the interfacial tension reducing agent may be dried in a separate vessel or in the same vessel as the compartmentalized pellet.

After drying the pellets, the polyester, polyamide, and interfacial tension reducing agent are melt blended and then molded, formed or cast into an article. Melt blending involves heating the separate materials so that the polyester, polyamide and if not bound in the polymer, the interfacial tension reducing agent, are above their respective melt temperatures and then mixing them together under shear force, such as exists in an extruder. The actual blending could occur in a stirred vessel or extruder, such as injection molding machine. After the material is melt blended it is shaped into one of the articles discussed earlier.

Regardless of when the interfacial tension has been introduced into the composition, the molded article is generally not hazy. However, once the article is stretched into a further article, usually a container sidewall, the spherical domains will elongate, become ellipsoidal, and at least one diameter of the ellipse will become large enough to interfere with the visible light. Mathematically expressed, one of the diameters of the ellipse will be greater than approximately 400 nm but less than approximately 720 nm; corresponding to the wavelength range of visible light.

References to the container sidewall and container wall of this invention also refer to the lid, bottom and top sides of the container, and a film that may be wrapped around the product such as meat wraps. The container wall may be completely stretched or have stretched and unstretched portions. For example, a reheat blown or injection stretch blown bottle is a container with a highly stretched portion in the middle of the wall, with the wall having successfully lower stretch until the wall is unstretched in the neck and thread areas. For clarity, the thread, neck, and sealing portions where the cap is applied are considered part of the wall of a container. In a reheat blown bottle the threads and neck area are generally unstretched. A preform or parison is also a container with at least one wall. Although an intermediate product, the preform is capable of containing a packaged content.

Stretching occurs when the molded article, film or fiber is heated or cooled to the elongation temperature of the composition. The elongation temperature is a temperature at which the article can be stretched and is usually the range of the 10° C. below the article's glass transition temperature and 10° C. below its melt point. The article is then usually restrained at least one point and subjected to a force which pulls or elongates the article. The article can be pulled or stretched in one or two, or in the case of a bubble, or bottle, three directions. A fiber or a uni-axial stretched film is an example of uniaxial stretching. A stretched fiber is pulled in the direction of its length to build strength. A film will be placed in machine called a tenter frame which has a sequence of gears that move progressively faster, thus stretching the film between each gear or other attaching mechanism.

In the case of bottles, bi-axially oriented films, or blown films, the article is stretched in at least two directions. In the case of a blown bottle or reheat blow or reheat stretch blow bottle, the preform is held steady at the threads and pressure such as compressed air is introduced into the article, also known as a preform or parison. The compressed air will then expand the article to take on the shape of the blow mould surrounding the article. Depending upon the design of the article and the mould, the article will have varying degrees of stretch in the two directions.

In films, there are some techniques which simultaneously stretch the article in the machine and transverse directions. However, in industrial practice it is more common to stretch the film first one way, then the other.

It is this stretched article where this composition is particularly useful. By lowering the interfacial tension so that the diameter of the domains of dispersed polymer are extremely small, the article can be stretched to higher levels, and still maintain a reduced haze appearance because the more of the stretched particles are still below the 400 nm or the wavelength of light.

The amount of stretch, also known as draw, is described as the stretch ratio or the area of stretch. In the case of a uniaxial stretch, the ratio is the length of the stretched article divided by the length of the unstretched article, where both lengths are measured in the direction of stretch. A 2 cm specimen stretched to 8 cm would have a stretch ratio of 4.

For a bi-axially stretched article, the ratio is often described as the stretch ratio of direction one multiplied by the stretch ratio of direction two, where direction one is perpendicular to direction two. Thus a an article stretched 3 times in one direction and 3 times in the other direction (perpendicular to the first direction) has a stretch ratio of 3×3 or 9. However, an article with a stretch ratio of 2 in one direction and 4.5 in the perpendicular direction also has a stretch ratio of 9.

Another technique to measure stretch ratio, draw ratio, or drawdown ratio is to trace or scribe a circle onto a plane of the article, measure the area of the circle, stretch the article, then measure the new area circumscribed by the enlarged circumference of the old circle. The stretch ratio is then the area of the new stretched circle divided by the area of the unstretched old circle. That stretch ratio can also be determined by using the ratio of the respective diameters or respective radii.

In the case of the three dimensional stretch, the change in volume or area of a sphere could be used to determine the stretch ratio.

Regardless of the technique used to measure the stretch ratio, stretching the molded article causes the dispersed component to stretch as well. Even if the dispersed component does not stretch, the domain surrounding the dispersed component will elongate. If the elongation of the domain whether it is completely filled with the dispersed material or not is greater than approximately 400 nm but less that about 720 nm, then the stretched article will have an increased Hunter Haze value, where haze is the measure of the amount of light deviation from the direction of transmittance by at least 2.5 degrees.

If enough of the particles have diameters between 400 and 720 nanometers, then the haze will be detectable by the human eye. As discussed below, the standard deviation of the particle size distribution becomes important as well.

It is therefore important that the diameter of the dispersed particle be small enough so that when stretched, the longest dimension of the dispersed particle and the domain encompassing the particle be less than 400 nm. For an article which stretches 3 in one direction and 3 in another, the maximum particle size in unstretched article should be 400 nm divided by 3, or 133 nm. For the article stretched 2×4.5, the particle size should be less than or equal to 400 divided by 4.5, or 89 nm. The target average diameter of the dispersed particles in the unstretched matrix phase could then be easily expressed as 400 divided by longest dimension of stretch. For example, if the final stretch dimension was 7×2, then the goal would be to modify the interfacial tension so that the average particle diameter in the unstretched article would be 400 divided by 7, or 57 nm. It is not only important that the average diameter be below a certain size, but that the distribution be narrow enough to reduce the number of dispersed particles which will exist between 400-700 nm after stretching. The goal is to minimize the number of domains in the visible region, therefore reducing the average domain size is important, but reducing the wide distribution is also important.

Because the particles occur in a distribution, the average particle diameter is used. Given the ranges of stretch ratios, the average diameter of the dispersed particles in the unstretched container should be less than 125 nm, more preferably less than 100 nm, even more preferably less than 80 nm. For articles to be stretched into high stretch, high strength materials, average particle diameters of less than 90 nm should be used, with particle size less than 70 nm preferred, and particle size less then 60 nm even more preferred, with the best appearance occurring with an average particle diameter less than 50 nm. Not all the particles need to be below 400 nm in the stretched bottle for the bottle to have low or acceptable haze. However, the goal is to have as many domains as possible below 400 nm.

When the composition of a crystallizable polyester, a polyamide with a low amino to carboxyl end group ratio, and a lithium sulfoisophthalate interfacial tension reducing agent, is stretched, the polyamide domains stretch far less than the stretch of the article.

The thickness of the wall of the container of this invention can range from 0.01 mm in the case of a film to the thickness of a preform which is usually less than 6.5 mm. In the case of the bottle, the stretched wall usually has a thickness of 0.2 to 0.9 mm. A container wall can also consist of layers of varying thickness, the thickness of the layers is usually between 0.02 and 0.2 mm. A monolayer, which is the preferred wall of the container, consists of one layer. A monolayer of the polyester-polyamide dispersion would consist of one layer. This does not mean that monolayer could not have a label wrapped around it. It would still be a mono-layer bottle. In contrast, the multilayer bottle would contain at least one layer of the composition.

Analysis of the dispersion at this point shows the polyamide dispersed into the polyester matrix phase. There are many techniques to analyse the dispersion characteristics. However, the location of the measurement on the article is critical. The dispersion characteristics, including domain size of the dispersed polyamide, in the unstretched article can be measured in the unstretched area of the stretched article. The unstretched area can exist in an unstretched area of the wall, such as the thread, neck, and certain sealing surfaces or it can be measured on the article before stretching. Measuring the size of the dispersed particles in the article before stretching the article yields the same value as measuring the size in the unstretched portion after stretching. Therefore, if the stretched wall does not have an unstretched portion, the size of dispersed particles prior to stretching are to be used. In many instances, the measurement in the examples were made on the preform or parison prior to stretching.

Measuring the domains in a stretched section of the wall is self evident and is usually made in the area of the highest stretch as that area is most likely to have largest number of domains in the visible light region.

Figure 3:
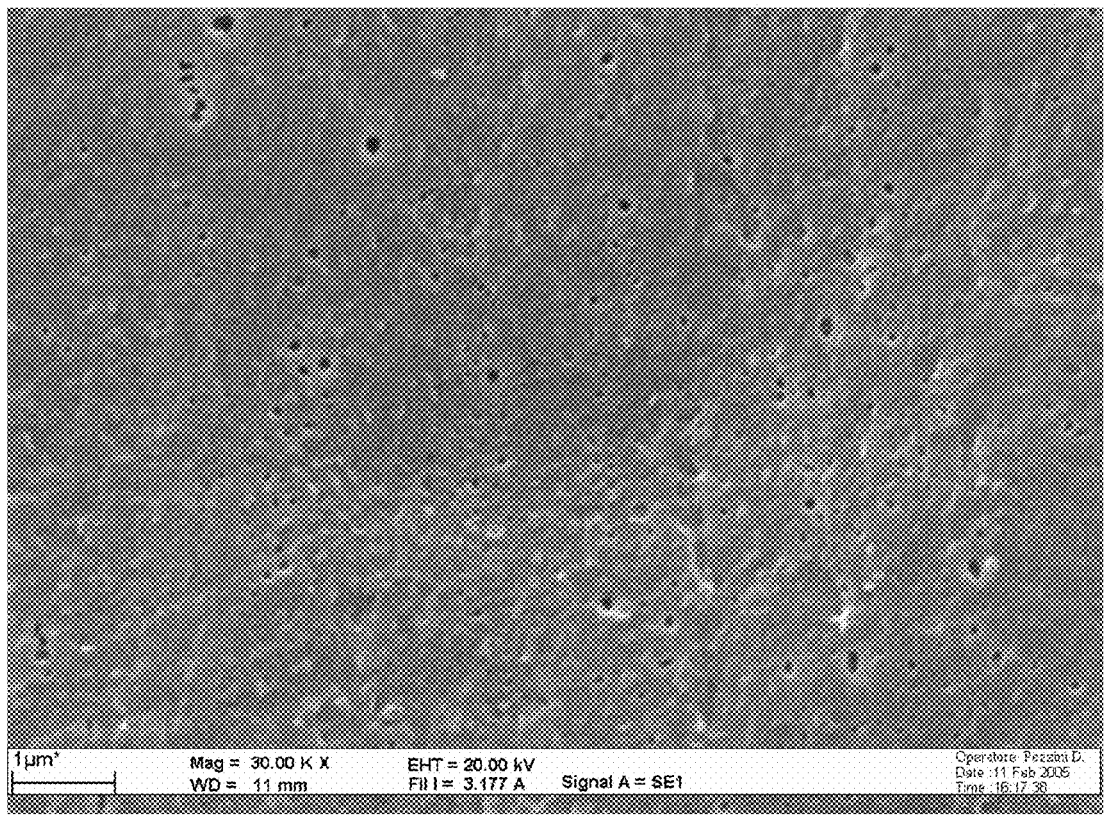
FIG. 3 depicts a scanning electron microscope photomicrograph of polyamide domains dispersed into a polyester matrix in the presence of an interfacial tension reducing agent—lithium sulfoisophthalate derived from lithium sulfoisophthalic acid (LiSIPA). As detailed below, the sample was prepared by removing the polyamide with cold formic acid.

In SEM technique, a fractured sample is treated with cold formic acid to remove the polyamide from the PET and the sample subjected to scanning electron microscopy (SEM). Based upon contrast, the domains where the polyamide once was can be readily determined and measured. (See FIGS. 1 and 3). FIGS. 1 and 3 demonstrate the contrast between the matrices. The domains can be measured by hand or by computer techniques.

Since the molded sample is unstretched, the particles are present as spheres. The SEM picture can be analyzed either manually or with various computer programs. The average particle size can then be easily calculated from the picture. The average would be determined by summing the diameters of all the particles in the picture and dividing by the number of particles in the picture.

Figure 2:
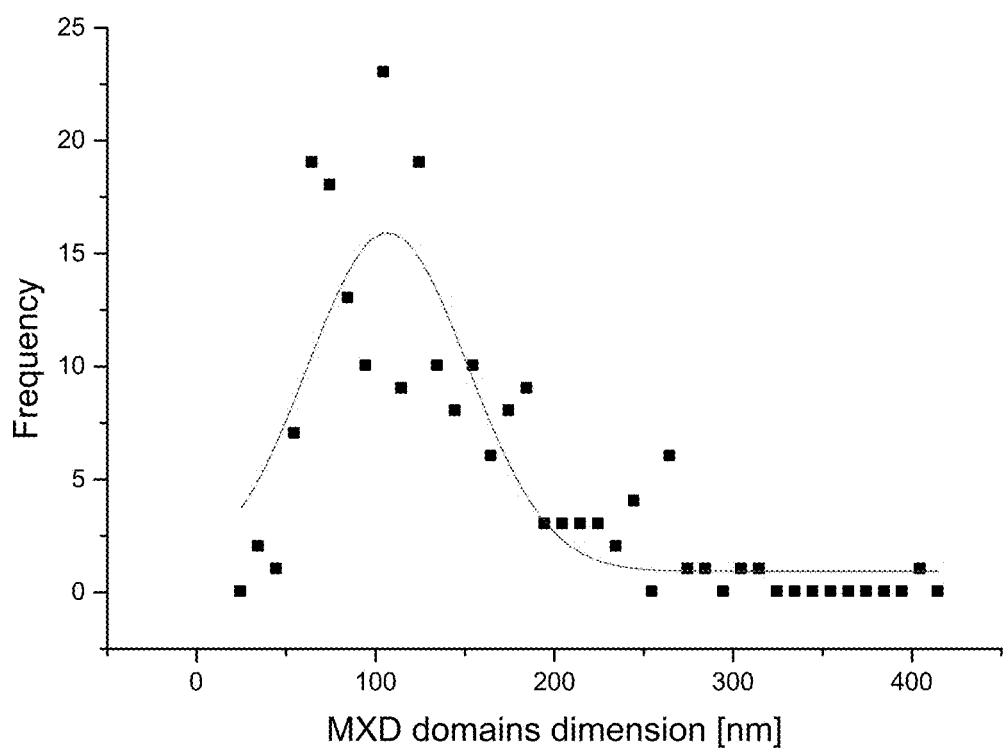
FIG. 2 depicts the graphical representation of the distribution of the domains corresponding to the polyester-polyamide system of FIG. 1.
Figure 4:
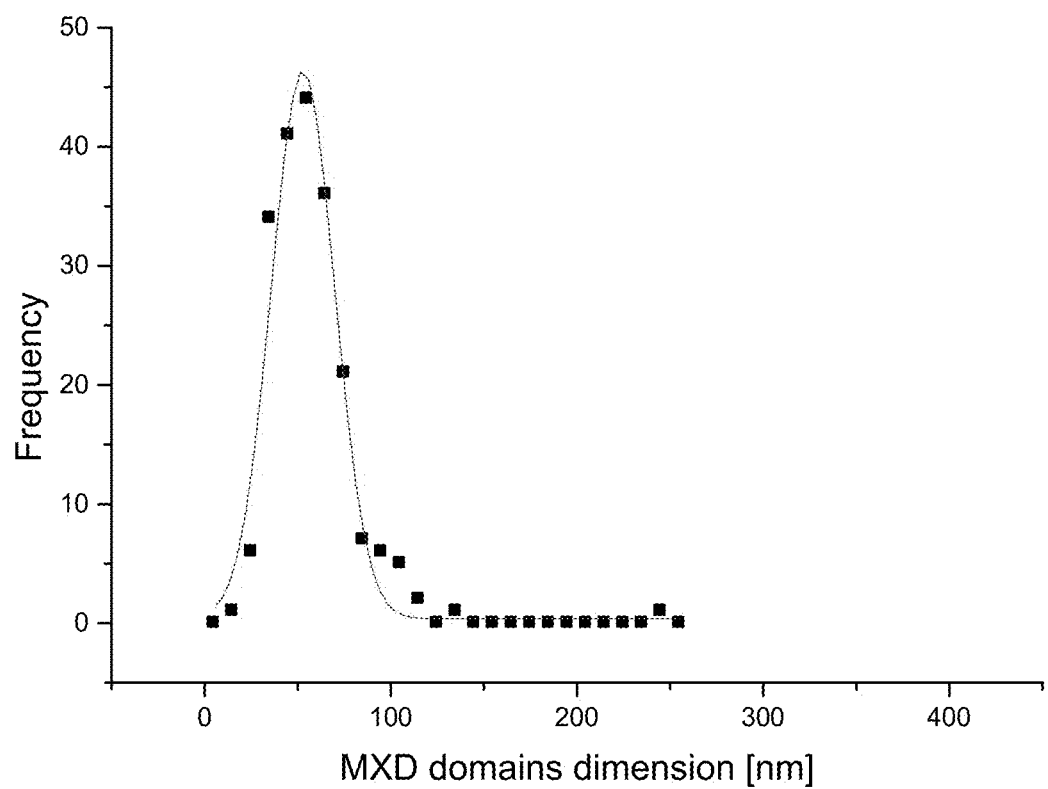
FIG. 4 depicts the graphical representation of the distribution of the domains corresponding to the polyester-polyamide system of FIG. 3.

Similarly, a distribution analysis as shown in FIGS. 2 and 4 can be done, by making a histogram of the number of particles corresponding to a given diameter. The data can also be normalized to a make a particle density function. Such normalization would be done by taking the number of particles per area observed and then multiplying or dividing by the factor desired to normalize the results.

For example, if one wanted to normalize the observation of 250 particles per 100 square nano-meters to the number of particles for 1000 square nano-meters, one would multiply 250 by 10, which is the factor of 1000 square nano-meters divided 100 square nano-meters.

The percent of stretch is defined the domain stretch ratio divided by the polyester stretch ratio in the same direction can be determined as follows.

The domain stretch ratio is the average length of the domains after stretching in the measured direction divided by the average length of the domains prior to stretching. Since the unstretched domain is spherical, any radius or direction can be used.

For some containers, it is not essential to measure the domain diameter in the axis of the stretch because the stretch in another axis yields the same result. In the bottle sidewall, the analysis can be done on the domain running parallel to the wall edge, or perpendicular to the line of sight. The largest stretch is likely in the hoop or outward radial direction. Note, that the same measurement would be obtained if the analysis viewed the domain perpendicular to the line of sight, parallel to the axial direction. This is because the largest part of domain is the same at both angles of view. Only if the analysis was taken perpendicular to the line of sight, but parallel to the hoop direction would the maximum domain diameter be different.

The polyester or matrix stretch ratio is the change in amount the matrix has been stretched coincident in the approximate area where the domain is measured. The easies to way to measure the stretch ratio for the percent of stretch calculation is to place a line on the article of known length. The article is stretched, presumably in the direction of the line and the new length is then measured. The polyester stretch ratio is the length of the stretched line divided by the length of the unstretched line.

The percent stretch is then the domain stretch ratio divided by the matrix or polyester stretch ratio. As shown in Series 9, the percent of stretch of the traditional sodium isophthalate interfacial tension reducing agent was 91 while the percent of stretch using the lithium salt was 71.

The colour and brightness of a thermoplastic article can be observed visually, and can also be quantitatively determined by a HunterLab Color Quest Spectrometer. This instrument uses the 1976 CIE, a*, b* and L* designation of colour and brightness. An a* coordinate defines a colour axis wherein plus values are toward the red end of the colour spectrum and minus values are toward the green end.

The b* coordinate defines a second colour axis, wherein plus values are toward the yellow end of the visible spectra and minus values are toward the blue end of the visible spectra.

Higher L* values indicate enhanced brightness of the material.

Based upon the above discussion, the preferred composition is a polyester modified with lithium sulfoisophthalate, in particular a crystallizable polyethylene terephthalate or its copolymers, blended with a polyamide polymer, preferably MXD6 or nylon 6 having an amino to carboxyl end group ratio of less 0.06 and a relative viscosity of approximately 1.695.

Another preferred embodiment is a blend of a crystallizable polyethylene terephthalate or its copolymers, a polyamide (in particular MXD6 or nylon-6) with an amino to carboxyl end group ratio of less 0.06 and a relative viscosity of approximately 1.695 and a separate interfacial tension reducing agent. Such separate interfacial tension reducing agent could be a metal salt of sulfonated polystyrene or a metal salt of sulfonated polyester.

The preferred article is the monolayer stretched wall of a container. This wall can be stretched from a preform, the hollow tube with a closed end or an extrusion blow process wherein the composition is extruded into a continuous tube and a mold surrounds the tube, pinching the tube closed at one end. Air is then injected into the other end expanding an stretching the tube in the shape of the container.

The haze of the stretched wall is a critical attribute. At no point in the stretched wall should the Hunter haze exceed certain preferred haze expressed as Hunter Haze %, or percent Hunter haze per millimetre wall thickness. Preferably the wall should have less than 20 percent Hunter haze per mm, with less than 16 percent Hunter haze per millimetre even more preferred, with less than 14 percent Hunter haze per millimetre even more preferred, with less than 12 percent Hunter haze per millimetre even more preferred, with less than 10 percent Hunter haze per millimetre even more preferred, with less than 9 percent Hunter haze per millimetre even more preferred, and less than 8.5 percent Hunter haze per mm the most preferred.

Experimental

The following examples demonstrate the functionality of this invention. In Examples 1 through 3, 100 grams of polyamide pellets with the end group and molecular weights provided in Table I were dried separately and melt blended with 1900 grams of a crystallizable polyester having the characteristics demonstrated in Table I. Note that the crystallizable polyester in examples 2 and 3 contained the interfacial tension reducing agent at the mole percents indicated polymerized into the backbone of the polymer. Examples 2A and 2B are Crystar 3919/089 available from E.I. Dupont Nemours, USA. The crystallizable polyester with the interfacial reducing agent, lithium sulfoisophthalate, copolymerized into the backbone used in Examples 3A and 3B were prepared in the following manner.

Crystallizable polyesters containing various amounts lithium sulfonate in the form of lithium isophthalate derived from lithium sulfoisophthalic acid (LiSIPA) were manufactured by placing 7567 gms of terephthalic acid, 157 gms of isophthalic acid, and 2974 gms of ethylene glycol into a vessel of pre-reacted oligomers from the previous batch. The contents were held under 3.38 bar pressure at 262° C. After 35 minutes, 45.4 gms of 1% lithium by weight mixture of lithium acetate in ethylene glycol and 18.1 gms of 1% phosphorous by weight mixture of phosphoric acid diluted in ethylene glycol was charged to the reactor. The contents were held in this vessel under agitation for 3 hours with an oil temperature of 271° C., content temperature increasing from 248° C. to 263° C., at 3.38 bar. During the time water was removed from the vessel.

After reacting for 3 hours, a portion of the contents were transferred to a second vessel. The amount remaining in the first vessel was approximately the same amount as was in the vessel when the raw materials were first charged. Once in the second vessel, 146 gms of a 5% bis-hydroxyethyl ester of lithium sulfoisophthalic acid-95% ethylene glycol solution and 1044 gms of ethylene glycol were added to the material transferred from the first vessel to the second vessel. The contents of the second vessel were agitated at atmospheric pressure and 244° C. After 30 minutes another 146 gms of the bis-hydroxy ester of lithium sulfoisophthalic acid, 1044 gms of ethylene glycol were added to the second vessel. After 30 minutes of mixing, 38.6 gms of 0.47% by weight cobalt mixture of cobalt acetate and ethylene glycol were added to the second vessel. After 3 minutes of mixing 206 gms of a 1% antimony by weight mixture of antimony oxide in ethylene glycol was added to the vessel.

After 45 minutes the pressure was reduced to 100 torr, and after another 26 minutes, the pressure reduced to 1.0 torr. 40 minutes later the pressure was 0.2 torr and held for 20 minutes before discharging the ingredients and pelletizing the material.

This amorphous material was combined with several other similarly produced batches and then solid phase polymerized in a batch rotating vacuum vessel at 0.1 mmHg and 232° C. until a 0.802 I.V. (dl/gm) was reached. The amount of lithium sulfoisophthalate was varied for the resulting mole percentages. The amount of lithium sulfoisophthalate reported in the tables is based upon measuring the amount of sulfur in the polymer using X-RAY and not upon the amount charged.

Examples 1A and 1B are the comparative examples demonstrating the detrimental effect of lowering the amino to carboxyl end group ratio without using an interfacial tension reducing agent. 1A and 1B show the haze dramatically increasing as the amino to carboxyl end group ratio is reduced. This is true, even though the molecular weight of the polyamide with the lower ratio is also lower. The opposite impact of the presence of the interfacial tension reducing agent is demonstrated by comparing Examples 2A with 2B and 3A with 3B which both demonstrate that regardless of the metal type, the haze is reduced when the amino to carboxyl end group is reduced. The superiority of the Li salt is demonstrated by comparing the color of the lithium (Series 3) and the sodium (Series 2).

TABLE I

Impact of an Interfacial Tension Reducing Agent on Polyester Blended with a Polyamides of Varying Amino to Carboxyl End Group Ratio (AEG/CEG)

| Example | 1A | 1B | 2A | 2B | 3A | 3B |
|---|---|---|---|---|---|---|
| Polyamide (wt % of polymer components) | 5 | 5 | 5 | 5 | 5 | 5 |
| R.V. | 2.3-2.5[a] | 1.695 | 2.3-2.5[a] | 1.695 | 2.3-2.5[a] | 1.695 |
| Amino End Group (AEG) (mmol/kg) | 16 | 12 | 16 | 12 | 16 | 12 |
| Carboxyl End Group (CEG) (mmol/kg) | 68 | 196 | 68 | 196 | 68 | 196 |
| AEG/CEG (Amino to Carboxyl End Group Ratio) | 0.24 | 0.0612 | 0.24 | 0.0612 | 0.24 | 0.0612 |
| Mn based on Total End Group (TEG) | 23810 | 9615 | 23810 | 9615 | 23810 | 9615 |
| Polyester and Interfacial Tension Reducing Agent (wt % of polymer components) | 95 | 95 | 95 | 95 | 95 | 95 |
| TPA mole %[b] | 97.5 | 97.5 | 98.2 | 98.2 | 98.3 | 98.3 |
| IPA mole %[b] | 2.5 | 2.5 | 0 | 0 | 1.2 | 1.2 |
| LiSIPA mole[b] % | 0 | 0 | 0 | 0 | 0.5 | 0.5 |

TABLE I-continued

Impact of an Interfacial Tension Reducing Agent on Polyester Blended with a Polyamides of Varying Amino to Carboxyl End Group Ratio (AEG/CEG)

| Example | 1A | 1B | 2A | 2B | 3A | 3B |
|---|---|---|---|---|---|---|
| NaSIPA mole[b] % | 0 | 0 | 1.72 | 1.72 | | |
| Cobalt (ppm) | 0 | 0 | 40 | 40 | 25 | 25 |
| Preform | | | | | | |
| Average Domain Size (nm) | 239 | 405 | 71.9 | 58.6 | 47.6 | 44.93 |
| Stretched Bottle Sidewall | | | | | | |
| Polymer Stretch Ratio in Hoop direction | 2.91 | 3.09 | 3.36 | 3.36 | 2.73 | 2.73 |
| Hunter b* | 11.83 | 12.96 | 10.59 | 8.35 | 8.3 | 5.7 |
| Thickness (mm) | 0.3 | 0.29 | 0.28 | 0.28 | 0.29 | 0.31 |
| Domain Size (nm) | 799 | 1146 | 220 | 234 | 93.2 | 68 |
| Domain Stretch Ratio in hoop direction | 3.34 | 2.8 | 3.06 | 4.0 | 1.96 | 1.5 |
| Polymer Stretch Ratio in Hoop direction | 2.91 | 3.09 | 3.36 | 3.36 | 2.73 | 2.73 |
| Percent of Stretch | 115 | 90 | 91 | 119 | 71 | 55 |
| Haze (%) | 12.09 | 21.6 | 5.7 | 3.9 | 6.1 | 4.9 |
| % Haze/mm | 40 | 74 | 20 | 14 | 21 | 16 |

[a]Typical Measured Values for MXD6 6007
[b]mole % of the acid groups refer to acid moiety derived from the abbreviation. For example, TPA mole % refers to the number of moles of terephthalate (derived from terephthalic acid (TPA) in the polymer. The same is true of the other monomers and when this nomenclature is found in the other tables.

Series 4, (Table II) establishes that cobalt is not needed. In Example 4A a polyester modified with sodium sulfo-isophthalate interfacial tension reducing agents was produced in a two vessel reactor train. The following demonstrates how the polymer containing 0.5 mole percent sodium sulfoisophthalate was made. The same procedure was used for the 2.0 mole percent.

8933.0 gms of dimethyl terephthalate, 69.7 gms di-methyl sodium sulfoisophthalate, 7175 gms ethylene glycol and 261 g manganese acetate were added to the first vessel. The ingredients were heated to 214° C. at a rate of 0.4° C. per minutes and the methanol removed. After the removal of 3660 ml of methanol, the ingredients were transferred to the second vessel and the batch temperature increased to 226° C. 67 gms of phosphite stabilizer were added and mixed for 5 minutes. 140 gms of isophthalic acid were then added to the batch. After stirring for 15 minutes, 77 gms of Cobalt Acetate, and 173 gms of glycolated antimony oxide were added and the vessel placed under a vacuum of 0.13 millibar. The batch was continually agitated and the temperature increased to 256° C. The resulting polymer was discharged and pelletized after reaching the desired intrinsic viscosity. The polymer produced in this particular batch had an I.V. of 0.53 dl/gm, 14 carboxyl end group number (equivalent milligms per gram of polymer) and a melt point of 246.9° C.

The molecular weight of the material was increased by solid phase polymerizing several melt batches in a rotating vacuum vessel. The solid phase polymerization was accomplished by placing 5 melt batches of the same molecular constituency into the vessel. The vessel pressure was reduced to 0.13 millibar, the temperature set at 225° C., and the vessel slowly rotated so the material tumbled on itself. After 12 hours of tumbling, the temperature was increased to 230° C. for 6 hours, and then increased to 235° C. for 2 hours. The pellets were then cooled and discharged. The final Intrinsic Viscosity was 0.82 dl/gm.

Example 4B is very similar to 4A, except that the formulation was adjusted to yield a polymer having 2 mole percent sodium isophthalate.

In example 4C, no cobalt was used. The polyester containing 0.5 mole percent lithium sulfonate was made in the same manner as Example 3, except that the cobalt acetate was replaced with a non-cobalt colour package. The colour package was added at the beginning of the reaction and consisted of 3.03 ppm on the basis of the final polymer yield of SB138 (Solvent Blue 138) and 1.60 ppm on the basis of the final polymer yield SV50 (Solvent Violet 50). Both colorants are available from Colorchem International as Amaplast Violet PC and Amaplast Blue HB. These colorant levels were selected to yield the similar L*,a*, b* as the cobalt acetate.

The modified polyesters of 4B and 4C were dried separately, then melt blended with 7% by weight MXD6 nylon (Grade 6007 from Mitsubishi Gas Chemical, Japan) and injection molded into preforms and subsequently blown into a bottle. Example 4A was combined with MXD6 nylon (Grade 6001 from Mitsubishi Gas Chemical, Japan) and made into a bottle in a similar manner. Example 4D used an MXD6 with much lower molecular weight and amino to carboxyl end group ratio with a polyester composition containing the following additives in addition to those listed in the table: 12 ppm P(as phosphoric acid), 250 ppm Sb, 30 ppm FeP (iron phosphide), 50 ppm Li(as acetate), SB138(2.42 ppm) and SV50 (1.60 ppm) Not only does it have a measured superiority over the others, it was considered the best aesthetic bottles by all who visually examined the bottles.

TABLE II

Elimination of Cobalt

| Example | 4A | 4B | 4C | 4D |
|---|---|---|---|---|
| Polyamide (wt % of polymer components) | 6001, 7% | 6007, 7% | 6007, 7% | 5 |
| R.V. | 2.1[a] | 2.3-2.5[a] | 2.3-2.5[a] | 1.72 |
| AEG (mmol/kg) | 38[a] | 14 | 14 | 11 |
| CEG (mmol/kg) | 98[a] | 64 | 64 | 162 |
| AEG/CEG (Amino/Carboxyl end Group Ratio) | 0.388 | 0.219 | 0.219 | 0.0612 |
| Mn based on Total End Groups | 14,706 | 25,641 | 25,641 | 11,560 |
| Polyester (wt % of polymer components) | | | | |
| TPA mole % | 97.71 | 95.55 | 98.3 | 98.3 |
| IPA mole % | 1.79 | 2.45 | 1.2 | 1.2 |
| LiSIPA mole % | 0 | 0 | 0.5 | 0.5 |

TABLE II-continued

Elimination of Cobalt

| Example | 4A | 4B | 4C | 4D |
|---|---|---|---|---|
| NaSIPA mole % | 0.5 | 2.0 | 0 | 0 |
| Cobalt (ppm) | 25-40[c] | 25-40[c] | 0.0 | 0.0 |
| Bottle Hunter b* | 14.91 | 15.58 | 12.49 | 4.73[b] |

[a]Typical Values
[b]Average of three bottles
[c]Cobalt Ranges depending upon final resin color prior to blending with MXD6.

Example Series 5

The Overall Effect of the Low Amino to Carboxyl End Group Ratio

In 5A, 94.6 parts of the resin manufactured in a manner similar to Example 3 with 20 ppm Cobalt added as Cobalt Acetate was melt blended with 5.4 parts of MXD6 nylon and injected into a preform. The MXD6 nylon had a relative viscosity of 1.599, 9 mmol/kg Amino End Groups (AEG), 228 mmol/kg Carboxyl (Acid) End Groups (CEG), (AEG/CEG=0.0395) and number average molecular weight of 8,439. The average diameter of the domains in the unstretched preform was 53.8+/−20.4 nm. Unexplainably and surprisingly the average diameter of the domains in the stretched portion was 89.9+/−40.2 nm.

Example 5B repeated 5A, but with a different MXD6 having a relative viscosity of 1.989, 9 mmol/kg Amino End Groups, 133 mmol/kg Carboxyl (Acid) End Groups, (AEG/CEG=0.0677) and number average molecular weight of 14,598. The average diameter of the domains in the unstretched preform was 49.6+/−22.5 nm. The average diameter of the domains in the stretched portion was 94.3+/−77.3 nm.

Example 5C is a comparative example according to the teachings of the prior art. A low molecular weight, high amino to carboxyl end group ratio MXD6 was melt blended with a polyester without the interfacial tension reducing agent. The MXD6 polyamide with relative viscosity of 1.687, 199 mmol/kg Amino End Groups, 33 mmol/kg Carboxyl (Acid) End Groups, (AEG/CEG=6.03) and number average molecular weight of 8,621 The polyester was Cleartuf® MAX, an 0.84 I.V. crystallizable polyethylene terephthalate containing 1.7-1.8 mole percent isophthalate derived from isophthalic acid and injected into a preform. The average diameter of the domains in the unstretched preform was 87.37+/−24.9 nm. The average diameters of the domains in the stretched portion were 308.8+/−83.23 nm. This is the expected result noting that 308/87=3.54, is the approximate stretch in one direction experienced by the preform.

Example 5E and 5F show the superiority of using the polyamide with the low amino to carboxyl end group ratio as opposed to the high amino to carboxyl end group ratio as taught in the prior art. Example 5E is the comparative example according to the prior art. In 5E the polyamide of 5C (AEG/CEG=6.03) was mixed with a polyester containing 0.5 mole % lithium sulfoisophthalate. In 5F, the polyamide with an AEG/CEG=0.0647 (less than 1.0) was added to the polyester of 5E. The improvement in haze with the same amount of polyamide demonstrates that the low AEG/CEG is superior to the high AEG/CEG when used in the presence of an interfacial tension reducing agent.

Series 6 demonstrates the use of the composition in the compartmentalized pellet. In Example 6A, polyester and polyamide having the same characterization of Example 5F were placed into the compartmentalized pellet construction. The polyamide was in the core and the polyester in the sheath. The compartmentalized pellets were then heated to 210 to 215° C. in a stirred vessel with nitrogen passing through the pellets. The pellets were held at this condition until the intrinsic viscosity of the total pellet reached approximately 0.81 dl/g. In practice this was about 10-14 hours. The pellets were then injection molded into a preform and stretched into a bottle. In Series 6B, a polyamide of much higher relative viscosity was used. As can be seen in Table III, the haze of the bottle made from the compartmentalized structure had haze equivalent to the components added separately.

TABLE III

Supporting Examples and Compartmentalized Pellet

| Example | 5A | 5B | 5C | 5D | 5E | 5F | 6A | 6B |
|---|---|---|---|---|---|---|---|---|
| Polyamide (wt % of polymer components) | 5.4 | 4.9 | 5 | 5 | 5 | 5 | 5 | 5 |
| R.V. | 1.599 | 1.989 | 1.687 | 2.38-2.5[a] | 1.687 | 1.68 | 1.68 | 2.428 |
| AEG (mmol/kg) | 9 | 9 | 199 | 14 | 199 | 13 | 13 | 13 |
| CEG (mmol/kg) | 228 | 133 | 33 | 64 | 33 | 201 | 201 | 89 |
| AEG/CEG (Amino/Carboxyl end Group Ratio) | 0.0395 | 0.0677 | 6.03 | 0.219 | 6.03 | 0.0647 | 0.0647 | 0.146 |
| Mn based on Total End Groups | 8,439 | 14,598 | 8,621 | 25,641 | 8,621 | 9,346 | 9,346 | 19,608 |
| Polyester (wt % of polymer components) | 94.6 | 95.1 | 95 | 95 | 95 | 95 | 95 | 95 |
| TPA mole % | 98.3 | 98.3 | 98.3[b] | 98.3 | 98.3 | 98.3 | 98.3 | 98.3 |
| IPA mole % | 1.2 | 1.2 | 1.7[b] | 1.2 | 1.2 | 1.2 | 1.2 | 1.2 |
| LiSIPA mole % | 0.5 | 0.5 | 0 | 0.5 | 0.5 | 0.5 | 0.5 | 0.5 |
| NaSIPA mole % | 0 | 0 | 0 | 0 | 0 | 0 | 0 | 0 |
| Cobalt (ppm) | 20 | 20 | 0 | 25 | 25 | 25 | 25 | 25 |
| Stretched Bottle Sidewall | | | | | | | | |
| Haze (%) | 3.47 | 5.19 | 5.4 | 5.4 | 3.7 | 2.6 | 2.8 | 4.44 |
| % Haze/mm | | 15.26 | 16.8 | 16.9 | 11.6 | 8.13 | 8.8 | 16.4 |

[a]Range of Values Measured for various lots
[b]Typical Values of the resin type used.

Test Methods
Intrinsic Viscosity

The intrinsic viscosity of intermediate molecular weight and low crystalline poly(ethylene terephthalate) and related polymers which are soluble in 60/40 phenol/tetrachloroethane can be determined by dissolving 0.1 gms of polymer or ground pellet into 25 ml of 60/40 phenol/tetrachloroethane solution and determining the viscosity of the solution at 30° C.+/−0.05 relative to the solvent at the same temperature using a Ubbelohde 1B viscometer. The intrinsic viscosity is calculated using the Billmeyer equation based upon the relative viscosity.

The intrinsic viscosity of high molecular weight or highly crystalline poly(ethylene terephthalate) and related polymers which are not soluble in phenol/tetrachloroethane was determined by dissolving 0.1 gms of polymer or ground pellet into 25 ml of 50/50 trifluoroacetic Acid/Dichloromethane and determining the viscosity of the solution at 30° C.+/0.05 relative to the solvent at the same temperature using a Type OC Ubbelohde viscometer. The intrinsic viscosity is calculated using the Billmeyer equation and converted using a linear regression to obtain results which are consistent with those obtained using 60/40 phenol/tetrachloroethane solvent. The linear regression is I.V. in 60/40 phenol/tetrachloroethane=0.8229×IV in 50/50 trifluoroacetic Acid/Dichloromethane+ 0.0124

Mole % of Acid and Glycol Moieties in the Polymer

The mole % of the acid and glycol moieties can be determined by digesting the polymer into its constituents and derivatizing the monomers in a methanol solution containing an internal standard and zinc acetate as a catalyst. The acids are derivatized to the dimethyl ester of the carboxylic acid, with the glycols moieties existing as the glycol. Quantification is then determined using the internal standard technique.

The derivatizing solution is prepared by dissolving 0.30 g of zinc acetate into a solution of 3.0 g reagent grade of Tetraethylene Glycol Dimethyl Ether and approximately 500 ml of methanol in a 1000 ml volumetric flask. After dissolution, the flask is filled to the mark with methanol and shaken for complete mixing.

The sample is digested by weighing 0.2+/−0.02 g of polymer and transferring to a reactor containing 4 ml of the derivatizing solution. Securely seal the reactor place in oven or otherwise heat to 220° C.+/−5° C. for 2 hours, maximum of 2.5 hours. Remove the reactor from the oven or heat from the reactor and allow to cool to room temperature. Transfer the solution to a 10 ml volumetric flask, rinsing the walls of the reactor twice with chloroform or dichloromethane until all the crystals are in solution. Fill the flask to the mark with chloroform or dichloromethane.

The techniques for the internal standard method are known in the art of using chromatography. While the number of samples depend upon the equipment, typically 4 standard solutions are made of varying compositions of the acids and glycols. These standards are then placed into the chromatograph machine and a calibration curve established. After the calibration curve established, the unknown sample is analyzed by the chromatograph.

Once the amount of acids and glycols are determined which is usually in weight percent of the sample, the amount of mole percent of the component in the polymer is merely a standard mathematical conversion.

For example, the mole percent of acid moieties derived from terephthalic acid will be the weight of the dimethyl terephthalate (DMT) measured on the chromatograph divided by the molecular weight of the DMT divided by the total moles of dimethyl esters of dicarboxylic acids in the sample. The moles of each dimethyl ester of a dicarboxylic acid is merely the weight measured divided by its respective molecular weight.

Therefore, $$\% \ Moles_{DMT} = \frac{Moles_{DMT}}{Moles_{TOTAL}}$$

Where:
% $Moles_{DMT}$=Mole percent of DMT (This also equals the equivalent moles of the TPA before derivatization of the sample.)
and $$Moles_{TOTAL} = \sum_{ALL \ METHYL \ ESTERS} Moles_A$$

Where:
$Moles_{TOTAL}$=Total of number of moles of di methyl esters (equivalent to moles of acid) in the sample
$Moles_A$=Number of moles of the individual di methyl esters which is equivalent to the number of moles of each acid.

Relative Viscosity

The relative viscosity of the polyamide, including MXD6, was measured with samples of 1 g polyamide in 100 ml 96 wt % sulphuric acid relative the 96 wt % sulphuric acid solvent by using a Ubbelohde viscometer 2 Type 50120 (Schott) according to DIN EN ISO 1628-1 and ISO 307-1984. The static bath where the viscometer is immersed should be at 25+/−0.05° C. The dissolution of the polyamide into the sulphuric acid should occur at temperatures no greater than 30° C. When the dissolution is completed, cool to about 25° C. and dilute the solution to the volumetric mark with solvent and mix well. The temperature of the solution during dilution shall lie between 23 an 27° C.

The Hunter Haze Measurement

The measurements were taken through the bottle sidewalls. A HunterLab ColorQUEST Sphere Spectrophotometer System with assorted specimen holders, and green, gray and white calibration tiles, and light trap can used to measure haze and color. The HunterLab Spectrocolorimeter integrating sphere sensor is a color and appearance measurement instrument. Light from the lamp is diffused by the integrating sphere and passed either through (transmitted) or reflected (reflectance) off an object to a lens. The lens collects the light and directs it to a diffraction grating that disperses it into its component wave lengths. The dispersed light is reflected onto a silicon diode array. Signals from the diodes pass through an amplifier to a converter and are manipulated to produce the data. Haze data is provided by the software. It is the calculated ratio of the diffuse light transmittance to the total light transmittance multiplied by 100 to yield a "Haze %" (0% being a transparent material, and 100% being an opaque material). Samples prepared for either transmittance or reflectance must be clean and free of any surface scratches or abrasion. The size of the sample must be consistent with the geometry of the sphere opening and in the case of transmittance; the sample size is limited by the compartment dimension. Each sample is tested in four different places, for example on the bottle sidewall or representative film area.

A Panametrics Magna-Mike 8000 Hall Effect Thickness Gauge or similar apparatus can be employed to measure the bottle sidewall thickness.

Component Separation and Determination of the Amount of Components in the Compartmentalized Pellet.

The amount of each component in the pellet can be determined by dissolving approximately one component away from the other. To separate the polyamide from the polyester, one gram of pellets is placed into a flask with 50 ml of formic acid and placed into an ultrasonic bath. The flask solution is shaken by the ultrasonic bath maintained at 30° C. temperature with a 110 hz sonification frequency for at least 15 minutes to dissolve the polyamide component. Thereafter, the material is then washed two times with deionized water during vacuum filtration. The pH of the water should be checked, and if acidic, the washing step is repeated until non-acidic. The amount of PET can be directly weighed and the polyamide amount determined by difference. If the polyamide core contains other compounds which are not soluble in formic acid, the solution can be filtered and the polyamide precipitated from the formic acid by adding water. The sample is then dried and the amount of polyamide determined by direct weighing.

Once separated from each other, the individual crystallinity or intrinsic viscosity of the component can be determined. In the case of I.V., the reported I.V. should be the average of six analysis.

Dispersed Domain Size Analysis.
Scanning Electron Microscopy

The sample is prepared by cutting the preform or wall of the container and putting the cut pieces in liquid nitrogen for five minutes. The pieces are then broken with a sharp blow. One piece of the perform or piece of the wall is cut into a slice at the specified angle. The slice is placed into a 50 cc. beaker and covered with approximately 25 cc of ≥96% formic acid (available as ACS reagent [64-18-6] from Fluka, Aldrich or Merck) and stirred at room temperature. The sample is removed after one hour and the slice washed with water until the water is a neutral pH. The sample is then washed with acetone.

After washing in acetone, the specimen is placed into an agar auto sputter coater (model 108 A, s.n. A10S) and plated with gold in order to make it conductive. Typical conditions for the agar auto sputter coater are to use an Argon flow, at 20 mA current for 30 seconds using gold metal.

The coated specimen is then placed into the SEM holder and photo taken. A typical SEM machine is SEM Leo Electronic Microscopy Ltd, model LEO 1450 VP, s.n. 01-22 used in vacuum chamber modality with Secondary Electron Detection 1 acquiring system. Other settings are Tension EHT: 20 KV Focal distance, also known as working distance or WD: 10-11 mm Spot size (dimensionless): 200-300 decreasing to 80 at large magnifications Filament current: 3-3.5A depending upon filament age.

The dimensions and distribution of polyamide domains are measured using Lucia M software (available from Nikon, Japan) in automatic or manual mode. Typically, more than 250 domains are measured over approximately 10 different pictures, with the number of domains analyzed per picture increasing with better dispersions. A statistical analysis on the domains is then carried out to determine the mean, the median and the distribution of the domains as in FIG. 4, and frequency of domains at a given size interval per unit area for each sample.

End Group Analysis

The polyamide contains a carboxyl end group and an amino end group. The shorthand is often expressed as AEG=amino end group content, CEG=carboxylic (or acid) end group content.

The end group concentrations are defined as amount of end groups (in mol) per mass unit polyamide, for example "X" mmol end groups per kg polyamide. The conversion to different units of expression is well known in the art. For the purposes of calculating the ratio it is only important that both AEG and CEG be expressed in the same units. The following analytical tests provide the number of end groups in the units noted. It should be pointed out that for both measurements, the polyamide should have less than 0.3% water. If not, drying at 70° C. in vacuo is necessary. The equipment used in the analysis must also be dry with no residual acids or bases on their surfaces.

The measurement of the amino end groups (AEG) is performed by titration of a solution of the polyamide in the presence of an indicator. The polyamide is dissolved by warming a mixture of phenol and methanol (e.g. 75 w. % phenol and 25 w. % methanol) and then adding a known amount of polyamide is added to the solution and held until it is dissolved.

The indicator solution is made by dissolving 65 mg of benzyl orange and 35 mg of methylene blue to 50 ml of methanol in a 100 ml volumetric flask. After dissolution, methanol is added to reach the 100 ml mark on the flask.

The titrant solution is a methanol containing perchloric acid solution in ethylene glycol. It is made by pipetting 1.72 ml perchloric acid into a 1000 ml volumetric flask followed by 100 ml of methanol. The 1000 ml flask is then filled to the 1000 ml mark with ethylene glycol and shaken to provide good mixing.

The standard solution is made by dissolving 0.04 g of 6-aminohexanoic in ca. 50 ml of the phenol/methanol solution at 50-60° C. in a 250 ml beaker. The solution is then quantitatively transferred to a 250 ml volumetric flask and the flask filled to the 250 ml mark with the solvent mixture.

The "f" factor of the quantitative equation is determined by pipetting 25 ml of the standard solution into a 100 ml Erlenmeyer flask. A magnetic stir bar is placed into the flask and an ascension pipe attached to the flask. The flask is then placed on a heated magnetic stir plate preheated to 105° C. The solution is then boiled under reflux for 20 minutes. The boiling temperature of the solution is about 90° C. Afterward the solution is cooled to room temperature (23° C.) and 3 drops of the indicator solution are added. The solution is then titrated with the perchloric acid solution under stirring until the colour changes from green to red.

The amount of perchloric acid solution consumed in ml is V1.

The consumption of the solvent solution without the standard is then undertaken as follows: 25 ml of the solvent solution is pipetted into a 100 ml Erlenmeyer flask. A magnetic stir bar is placed into the flask and an ascension pipe attached to the flask. The flask is then placed on a heated magnetic stir plate preheated to 105° C. The solution is then boiled under reflux for 20 minutes. The boiling temperature of the solution is about 90° C. Afterward the solution is cooled to room temperature (23° C.) and 3 drops of the indicator solution are added. The solution is then titrated with the perchloric acid solution under stirring until the colour changes from green to red.

The amount of the perchloric acid solution consumed in ml is V0. If the consumption is higher than 0.1 ml, the solvent mixture must be replaced and all the materials made using the solvent mixture also replaced.

The "f" factor of the perchloric acid solution is $f=(Ws/MW)/(1000*(V1-V0))$; mmol NH2/ml solution where
Ws is the exact weight of the 6-aminohexanoic acid in g
MW is the molecular weight of the 6-aminohexanoic acid (131.18 g/mol)

The amino end groups of the polyamide are determined by placing approximately 1 g of polyamide whose weight (Wp) is known to 0.0001 g into a 100 ml Erlenmeyer flask and pipetting 25 ml of the solvent solution into the flask. A magnetic stir bar is placed into the flask and an ascension pipe attached to the flask. The flask is then placed on a heated magnetic stir plate preheated to 105° C. The solution is then boiled under reflux for 20 minutes. The boiling temperature of the solution is about 90° C. Afterward the solution is cooled to room temperature (23° C.) and 3 drops of the indicator solution are added. The solution is then titrated with the perchloric acid solution under stirring until the colour changes from green to red. The amount of perchloric acid consumed in ml is V2.

The number of amino groups (AEG) is $AEG=[(V2-V0)*"f"*1000/Wp]$ (mmol NH2/kg polyamide)

Where
V2 is volume of perchloric acid solution consumed by the sample titration
V0 is the volume of perchloric acid solution consumed by the solvent
"f" is the factor determined previously
Wp is the exact weight of the sample to the nearest 0.0001 g The amino end group concentration can be calculated from the consumption of the perchloric acid.

The measurement of the carboxylic end groups can also be carried out by titration of a solution of the polyamide by usage of an indicator as well. The polyamide is dissolved in benzyl alcohol (phenylmethanol) by warming, e.g. boiling (ca. 245° C.) under a nitrogen reflux.

A suitable indicator or indicator mixture (e.g. propanolic solution of cresol red) is added to the hot solution (180° C.). This solution is immediately titrated with an alcoholic potassium hydroxide solution (KOH dissolved in a mixture of methanol, 1,-propanol and 1-hexanol), until color changes. The carboxylic end group concentration can be calculated from the consumption of the potassium hydroxide.

The titrant solution is prepared by dissolving 5.51 KOH in a volumetric flask with methanol filled to the 100 ml mark. 20 ml of the KOH-methanol solution are pipetted into a 1000 ml volumetric flask. The flask is then filled with 430 ml of 1-propanol and 550 ml of 1 hexanol. The concentration of this solution is about 0.02 N.

The indicator solution is made by dissolving 100 mg of cresol red into 100 ml of 1-propanol.

The solutions are tested by pipetting 25 ml of benzyl alcohol into an Erlenmeyer flask with a stir bar. An ascension pipe (for reflux) with a joint for nitrogen is attached to the Erlenmeyer flask and the system flushed with nitrogen. The benzyl alcohol in the Erlenmeyer flask is then heated on a magnetic stirrer at a slight boil (245° C.) for 25 minutes. The flask is then removed from the stirrer, the ascension pipe removed, allowed to cool to 180° C. and 6 drops of the indicator solution are added. The solution is titrated immediately with the KOH-solution until the colour changes from yellow to violet. The temperature of the solution during titration should not be less than 140° C. The consumption of the KOH-solution is V0 (ml) and should be less than 0.4 ml. If the consumption is greater than 0.4 ml, the solvents must be replaced with new ones.

The "f" factor must be determined for the titrate solution. This is done by using a polyamide standard of a known COOH. In this case, Ultramid AS2503 from BASF, DE was used with a COOH of 80.5 mmol/kg. Approximately 1 g, (accurate to 0.0001 g) of the polyamide standard is placed into a 100 ml Erlenmeyer flask. 25 ml of benzyl alcohol are pipetted into the flask with a stir bar. An ascension pipe (for reflux) with a joint for nitrogen is attached to the Erlenmeyer flask and the system flushed with nitrogen. The benzyl alcohol-polyamide is then heated on a magnetic stirrer at a slight boil (245° C.) for 25 minutes. The flask is then removed from the stirrer, the ascension pipe removed, allowed to cool to 180° C. and 6 drops of the indicator solution are added. The temperature of the solution during titration should not be less than 140° C. The solution is titrated with the KOH-solution until the colour changes from yellow to violet.

The "f" factor is then $"f"=CEG*W/(V1-V0)$

Where:
"f"=factor of the titrate solution
CEG=mEqu./kg of the standard polyamide COOH end groups, in this case AS2503
V1=consumption of the titrate solution in ml
V0=consumption of the titrate solution in system
W=exact weight of the AS2503 sample Example, using the 80.5 mmol/kg value for the standard polyamide
W=1.0100 g
V1=4.16 ml
V0=0.14 ml $"f"=80.5*1.0100/(4.16-0.14)=20.23$ The value of "f" should be in the range between 18 and 22, otherwise the measurement must be repeated.

The COOH end groups (CEG) of the sample polyamide are determined by placing approximately 1 g, (accurate to 0.0001 g) of the polyamide into a 100 ml Erlenmeyer flask. 25 ml of benzyl alcohol are pipetted into the flask with a stir bar. An ascension pipe (for reflux) with a joint for nitrogen is attached to the Erlenmeyer flask and the system flushed with nitrogen. The benzyl alcohol-polyamide is then heated on a magnetic stirrer at a slight boil (245° C.) for 25 minutes. The flask is then removed from the stirrer, the ascension pipe removed, allowed to cool to 180° C. and 6 drops of the indicator solution are added. The solution is immediately titrated with the KOH-solution until the colour changes from yellow to violet. The temperature of the solution during titration should not be less than 140° C. The amount of titrant solution consumed is V2 in ml.

The COOH end groups is then $"f"=CEG*W/(V1-V0)$ $CEG=[(V2-V0)*"f"]/W$

Where:
"f"=factor of the titrate solution determined earlier
CEG=mmol/kg
V2=consumption of the titrate solution in ml by the sample
V0=consumption of the titrate solution in system (ml)
W=exact weight of the polyamide sample (g).

EXAMPLE

W=1.0150 g
V2=4.11 ml
V0=0.16 ml
"f"=20.23 previously determined $$CEG = [(4.11 - 0.16) * 20.23]/1.015 = 78.3 \text{ mmol/kg}$$

We claim:
1. A composition comprising
a polyamide polymer, a crystallizable polyester and an interfacial tension reducing agent,
wherein
the polyamide polymer comprises a reaction product selected from the group consisting of the reaction product of amino caproic acid with itself and the reaction product of A-D where A is a residue of a dicarboxylic acid comprising adipic acid, isophthalic acid, terephthalic acid, 1,4 cyclohexanedicarboxylic acid, or naphthalenedicarboxylic acid and where D is a residue of a diamine comprising m-xylylene diamine, p-xylylene diamine, hexamethylene diamine, ethylene diamine, or 1,4 cyclohexanedimethylamine, wherein the amino to carboxyl end group ratio of the polyamide polymer is less than 0.20,
at least 85% of the crystallizable polyester's acid units are derived from the group consisting of terephthalic acid, 2,6 naphthalene dicarboxylic acid, the dimethyl ester of terephthalic acid, or the dimethyl ester of 2,6 naphthalene dicarboxylic acid
and the interfacial tension reducing agent is copolymerized into the polyester, which may be the crystallizable polyester or may be a second polyester component.

2. The composition of claim 1 wherein the polyamide polymer is MXD6.

3. The composition of claim 2 wherein the interfacial tension reducing agent comprises a metal sulfonate.

4. The composition of claim 2 wherein the interfacial tension reducing agent comprises lithium.

5. The composition of claim 1 wherein the polyamide polymer is nylon 6.

6. The composition of claim 5 wherein the interfacial tension reducing agent comprises a metal sulfonate.

7. The composition of claim 5 wherein the interfacial tension reducing agent comprises lithium.

* * * * *